United States Patent
McDaniel et al.

(10) Patent No.: US 12,130,376 B2
(45) Date of Patent: Oct. 29, 2024

(54) APPLICATION OF ADAPTIVE PULSE COMPRESSION (APC) IN CLUTTERED RADAR CROSS-SECTION (RCS) MEASUREMENTS

(71) Applicant: The Board of Regents of the University of Oklahoma, Norman, OK (US)

(72) Inventors: Jay W. McDaniel, Norman, OK (US); Justin G. Metcalf, Norman, OK (US); Rachel E. Jarvis, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 18/694,705

(22) PCT Filed: Oct. 13, 2023

(86) PCT No.: PCT/US2023/076873
§ 371 (c)(1),
(2) Date: Mar. 22, 2024

(87) PCT Pub. No.: WO2024/081902
PCT Pub. Date: Apr. 18, 2024

(65) Prior Publication Data
US 2024/0280665 A1 Aug. 22, 2024

Related U.S. Application Data

(60) Provisional application No. 63/379,553, filed on Oct. 14, 2022.

(51) Int. Cl.
*G01S 7/292* (2006.01)
*G01S 7/32* (2006.01)
(Continued)

(52) U.S. Cl.
CPC ............... *G01S 7/292* (2013.01); *G01S 7/32* (2013.01); *G01S 7/411* (2013.01); *G01S 13/282* (2013.01)

(58) Field of Classification Search
CPC . G01S 7/292; G01S 7/32; G01S 7/411; G01S 13/282
See application file for complete search history.

(56) References Cited

U.S. PATENT DOCUMENTS

2011/0084873 A1 4/2011 Wei et al.
2015/0260835 A1* 9/2015 Widmer ............... B60L 53/124
342/27

OTHER PUBLICATIONS

Ackroyd, Martin H., et al.; "Optimum Mismatched Filters For Sidelobe Suppression"; IEEE Transactions on Aerospace and Electronic Systems; vol. AES-9, No. 2; Mar. 1973; 5 pages.
(Continued)

*Primary Examiner* — Timothy A Brainard
(74) *Attorney, Agent, or Firm* — Conley Rose, P.C.; Grant Rodolph; Jonathan K. Polk

(57) ABSTRACT

A method comprising: obtaining I/Q data associated with a received radar signal; performing background subtraction on the I/Q data to obtain a subtracted signal; applying an algorithm to the subtracted signal to obtain a filtered signal, wherein the algorithm is based on a MSE filter; performing time-gating on the filtered signal to obtain a time-gated signal; applying a FFT to convert the time-gated signal to a frequency-domain signal; and applying a calibration set to the frequency-domain signal to extract an RCS of an OUT; and a system for conducting the method.

20 Claims, 18 Drawing Sheets

(51) Int. Cl.
*G01S 7/41* (2006.01)
*G01S 13/28* (2006.01)

(56) References Cited

OTHER PUBLICATIONS

Akyildiz, Ian F., et al.; "The evolution to 4G cellular systems: LTE-Advanced"; Physical Communication; vol. 3; 2017; 28 pages.
Barneto, Carlos Baquero, et al.; "OFDM Radar with LTE Waveform: Processing and Performance"; 2019 Radio Wireless Symposium (RWS); 2019; 4 pages.
Blunt, Shannon D., et al.; "Adaptive Pulse Compression"; IEEE; 2004; 6 pages.
Blunt, Shannon D., et al.; "Adaptive Pulse Compression via MMSE Estimation"; IEEE Transactions on Aerospace and Electronic Systems; vol. 42, No. 2; Apr. 2006; 13 pages.
Bose, Ranjan; "Lean CLEAN: Deconvolution Algorithm for Radar Imaging of Contiguous Targets"; IEEE Transactions on Aerospace and Electronic Systems; vol. 47, No. 3; Jul. 2011; 10 pages.
Chung, B. K., et al.; "A Microwave Anechoic Chamber for Radar-Cross Section Measurement"; IEEE Antennas and Propagation Magazine; vol. 39, No. 3; Jun. 1997; 6 pages.
Copper Mountain Technologies; "Optimizing Vna Measurement Speed"; Jan. 13, 2023; 10 pages.
Ding, Zhenyu, et al.; "Experimental Verification of Stepped Frequency Continuous Wave Ground-Based SAR"; IET International Radar Conference 2013; Apr. 14-16, 2013; 5 pages.
Dybdal, Robert B.; "Radar Cross Section Measurements"; Proceedings of the IEEE; vol. 75, No. 4; Apr. 1987; 19 pages.
Feng, Shiqi, et al.; "Reviewing the Application and Integration of Software Defined Radios to Radar Systems"; 2020 IEEE Radar Conference (RadarConf20); 2020; 6 pages.
Garmatyuk, Dmitriy, et al.; "Radar and Data Communication Fusion with UWB-OFDM Software-Defined System"; ICUWB 2009; Sep. 9-11, 2009; 5 pages.
Ghannouchi, Fadhel M., et al.; "Behavioral Modeling and Predistortion"; IEEE Microwave Magazine; Nov. 17, 2009; 13 pages.
Harris, Fredric J.; "On the Use of Windows for Harmonic Analysis with the Discrete Fourier Transform"; Proceedings of the IEEE; vol. 66, No. 1; Jan. 1978; 33 pages.
Inggs, Michael, et al.; "Growing Horns: Applying the Rhino Software Defined Radio System to Radar"; 2011 IEEE RadarCon (RADAR); May 23-27, 2011; 5 pages.
Jarvis, Rachel E., et al.; "Application of Adaptive Pulse Compression in Cluttered Radar Cross Section Measurements"; IEEE Transactions on Instrumentation and Measurement; vol. 71; 2022; 8 pages.
Jarvis, Rachel E., et al.; "High Temporal Resolution Time-Gating for Wideband Radar Cross Section Measurements"; Proceedings of the 51st European Microwave Conference; Apr. 4-6, 2022; London, United Kingdom; 4 pages.
Jarvis, Rachel E., et al.; "Measurement and Signal Processing Techniques for Extracting Highly Accurate and Wideband RCS"; 2021 IEEE International Instrumentation and Measurement Technology Conference (I2MTC); 2021; 6 pages.
Jarvis, Rachel E., et al.; "UHF-Band Radar Cross Section Measurements With Single-Antenna Reflection Coefficient Results"; IEEE Transactions on Instrumentation and Measurement; vol. 70; 2021; 4 pages.
Jarvis, Rachel E., et al.; "Wideband Measurement Techniques for Extracting Accurate RCS of Single and Distributed Targets"; IEEE Transactions on Instrumentation and Measurement; vol. 71; 2022; 12 pages.
Keysight; "Understanding and Improving Network Analyzer Dynamic Range"; Keysight Technologies; Jul. 14, 2022; USA; 11 pages.
Langman, A., et al.; "Pulse versus Stepped Frequency Continuous Wave modulation for Ground Penetrating Radar"; IEEE; 2001; 3 pages.
Levanon, N.; "Multifrequency complementary phase-coded radar signal"; IEE Proc.-Radar, Sonar Navig.; vol. 147, No. 6; Dec. 2000; 9 pages.
Mensa, Dean L.; "Wideband Radar Cross Section Diagnostic Measurements"; IEEE Transactions on Instrumentation and Measurement; vol. IM-33, No. 3; Sep. 1984; 9 pages.
Munnell, Caleb, et al.; "On the Practical Use and Experimentation of LTE Signals for Radar-Communications"; 2022 IEEE Radar Conference (RadarConf22); Mar. 21-25, 2022; 6 pages.
Owen, Jonathan W., et al.; "Demonstration of Real-time Cognitive Radar using Spectrally-Notched Random FM Waveforms"; IEEE; 2020; 6 pages.
Peccarelli, Nicholas, et al.; "Survey: Characterization and Mitigation of Spatial/Spectral Interferers and Transceiver Nonlinearities for 5G MIMO Systems"; IEEE Transactions on Microwave Theory and Techniques; vol. 67, No. 7; Jul. 2019; 18 pages.
Sanson, Jessica Bartholdy, et al.; "Cooperative Method for Distributed Target Tracking for OFDM Radar With Fusion of Radar and Communication Information"; IEEE Sensors Journal; vol. 21, No. 14; Jul. 15, 2021; 14 pages.
Sarkar, Tapan, K., et al.; "An Ultra-Low Sidelobe Pulse Compression Technique for High Performance Radar Systems"; 1997 IEEE National Radar Conference; 1997; 4 pages.
Seyfried, Daniel, et al.; "Stepped-frequency radar signal processing"; Journal of Applied Geophysics; vol. 112; Nov. 15, 2014; 10 pages.
Smith, Brian Hendee; "An Analytic Nonlinear Approach to Sidelobe Reduction"; IEEE Transactions on Image Processing; vol. 10, No. 8; Aug. 2001; 7 pages.
Stankwitz, H. C., et al.; "Nonlinear Apodization for Sidelobe Control in SAR Imagery"; IEEE Transactions on Aerospace and Electronic Systems; vol. 31, No. 1; Jan. 1995; 13 pages.
Sturm, Christian, et al.; "Performance Verification of Symbol-Based OFDM Radar Processing"; IEEE; 2010; 4 pages.
Sturm, Christian, et al.; "Waveform Design and Signal Processing Aspects for Fusion of Wireless Communications and Radar Sensing"; Proceedings of the IEEE; vol. 99, No. 7; May 27, 2011; 24 pages.
Taparugssanagorn, Attaphongse, et al.; "Analysis of the Effect of Nonlinear Low Noise Amplifier with Memory for Wideband Spectrum Sensing"; 2014 1st International Conference on 5G for Ubiquitous Connectivity (5GU); 2014; 5 pages.
Tice, Thomas E.; "An Overview of Radar Cross Section Measurement Techniques"; IEEE Transactions on Instrumentation and Measurement; vol. 39, No. 1; Feb. 1990; 3 pages.
Tsao, Jenho, et al.; "Reduction of Sidelobe and Speckle Artifacts in Microwave Imaging: The CLEAN Technique"; IEEE Transactions on Antennas and Propagation; vol. 36, No. 4; Apr. 1988; 14 pages.
Van Genderen, Piet, et al.; "Imaging of Stepped Frequency Continuous Wave GPR data using the Yule-Walker Parametric Method"; European Radar Conference, 2005. EURAD 2005; Oct. 3-4, 2005; 4 pages.
Yardibi, Tarik, et al.; "Source Localization and Sensing: A Nonparametric Iterative Adaptive Approach Based on Weighted Least Squares"; IEEE Transactions on Aerospace and Electronic Systems; vol. 46, No. 1; Jan. 2010; 19 pages.
Yardim, Funda Ergun, et al.; "Estimation of Radar Cross-Section in Rayleigh, MIE, and Optical Regions by the 2-D-FDTD Simulation"; IEEE Transactions on Antennas and Propagation; vol. 62, No. 11; Nov. 2014; 8 pages.
Zhao, Bin, et al.; "Adaptive Pulse Compression for Stepped Frequency Continuous-Wave Radar"; IEEE; 2011; 4 pages.
Zrnic, Bojan, et al.; "Range Sidelobe Suppression for Pulse Compression Radars Utilizing Modified RLS Algorithm"; IEEE; 1998; 4 pages.
PCT International Search Report; Application No. PCT/US2023/076873; Feb. 15, 2024; 2 pages.
PCT Written Opinion of the International Searching Authority; Application No. PCT/US2023/076873; Feb. 15, 2024; 8 pages.

\* cited by examiner

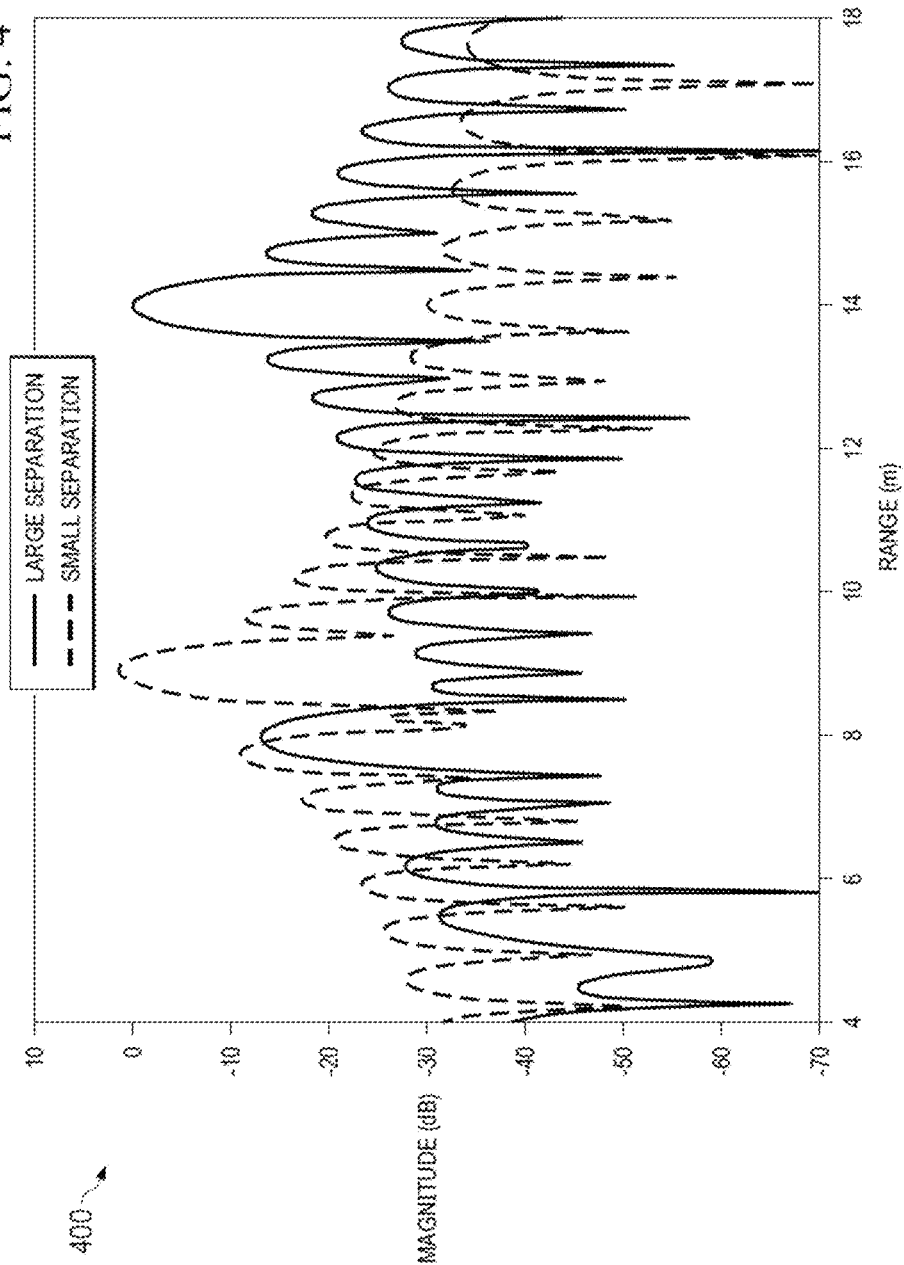

APPLICATION OF ADAPTIVE PULSE COMPRESSION (APC) IN CLUTTERED RADAR CROSS-SECTION (RCS) MEASUREMENTS

CROSS-REFERENCE TO RELATED APPLICATIONS

This is a national stage of Int'l Patent App. No. PCT/US2023/76873 filed on Oct. 13, 2023, which claims priority to U.S. Prov. Patent App. No. 63/379,553 filed on Oct. 14, 2022, both of which are incorporated by reference.

STATEMENT REGARDING FEDERALLY SPONSORED RESEARCH OR DEVELOPMENT

This invention was made with government support under Contract Number 2019-19082100001 awarded by the U.S. Federal Government and Contract Number 2034710 awarded by the National Science Foundation. The government has certain rights in the invention.

BACKGROUND

Radar system design relies on quantifying the expected power received from any targets of interest as well as from clutter. The RCS of an object defines how much incident power the object will reflect back to the radar. The RCS of electrically large or complex objects is often complicated to simulate or calculate analytically, so the RCS is often ascertained through measurement. Thus, it is critical to ensure minimal measurement error in order to extract accurate information.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a graph of the composite matched filter outputs when both targets are simulated together.

DETAILED DESCRIPTION

Figure 1A:
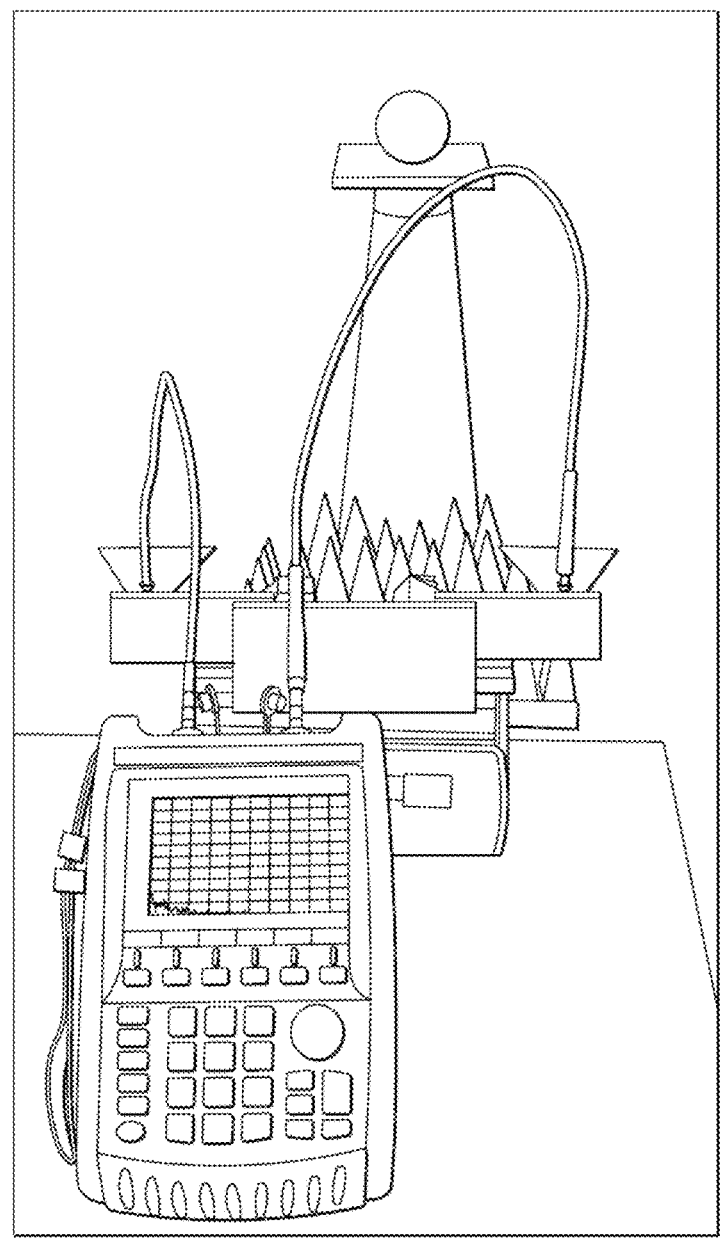
FIG. 1A is a picture of a setup to perform measurements without an anechoic chamber.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
APC: adaptive pulse compression
ASIC: application-specific integrated circuit
cm: centimeter(s)
CPU: central processing unit
dB: decibel(s)
dBsm: decibel(s) per square meter
DSP: digital signal processor
EO: electrical-to-optical
FFT: fast Fourier transform
FPGA: field-programmable gate array
GHz: gigahertz
Hz: hertz
IFFT: inverse fast Fourier transform
IAA: iterative adaptive approach
I/Q: in-phase/quadrature
LS: least-squares
m: meter(s)
MMSE: minimum MSE
MSE: mean square error
OE: optical-to-electrical
OFDM: orthogonal frequency-division multiplexing
OUT: object under test
RAM: random-access memory
RCS: radar cross-section
RF: radio frequency
RMMSE: reiterative MMSE
ROM: read-only memory
RX: receiver unit
SDR: software-defined radio
SFCW: stepped-frequency continuous-wave
SNR: signal-to-noise ratio
SRAM: static RAM
TCAM: ternary content-addressable memory
TX: transmitter unit
VNA: vector network analyzer.

Before further describing various embodiments of the apparatus, component parts, and methods of the present disclosure in more detail by way of exemplary description, examples, and results, it is to be understood that the embodiments of the present disclosure are not limited in application to the details of apparatus, component parts, and methods as set forth in the following description. The embodiments of the apparatus, component parts, and methods of the present disclosure are capable of being practiced or carried out in various ways not explicitly described herein. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description. While the apparatus, component parts, and methods of the present disclosure have been described in terms of particular embodiments, it will be apparent to those of skill in the art that variations may be applied to the apparatus, component parts, and/or methods and in the steps or in the sequence of steps of the method described herein without departing from the concept, spirit, and scope of the inventive concepts as described herein. All such similar substitutes and modifications apparent to those having ordinary skill in the art are deemed to be within the spirit and scope of the inventive concepts as disclosed herein.

All patents, published patent applications, and non-patent publications referenced or mentioned in any portion of the present specification are indicative of the level of skill of those skilled in the art to which the present disclosure pertains, and are hereby expressly incorporated by reference in their entirety to the same extent as if the contents of each individual patent or publication was specifically and individually incorporated herein.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

As utilized in accordance with the methods and compositions of the present disclosure, the following terms and phrases, unless otherwise indicated, shall be understood to have the following meanings: The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/ or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The phrase "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error for the apparatus, composition, or the methods or the variation that exists among the objects, or study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The terms "about" or "approximately", where used herein when referring to a measurable value such as an amount, percentage, temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure. More particularly, a range of 10-12 units includes, for example, 10, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, and 12.0, and all values or ranges of values of the units, and fractions of the values of the units and integers within said range, and ranges which combine the values of the boundaries of different ranges within the series, e.g., 10.1 to 11.5.

The term "object," where used herein, refers to any item, device, thing, or article that has a radar cross section when irradiated by a radar transmission. The object may be a target, for example.

In general, RCS measurement accuracy is a result of both the measurement configuration and post-processing techniques. A specialized setup dedicated to RCS measurements may not require much correction because the OUT is successfully isolated from almost all clutter. However, this hardware and the customized chamber are expensive and are typically limited by the chamber's quiet zone size. In addition, there are several reasons measurements are conducted outside of an ideal RCS anechoic chamber, including cost, OUT size, time, and space limitations. A generic anechoic chamber, such as one designed for antenna measurements, can have non-trivial multi-path reflections and high loss from long cables and free-space propagation. For measurements outside of a chamber, both indoors and outdoors, the floor and walls are even more reflective, and external signals are introduced. In either scenario, open environment or generic anechoic chamber measurements, the scatterer and multi-path clutter response are drastically increased.

Figure 1B:
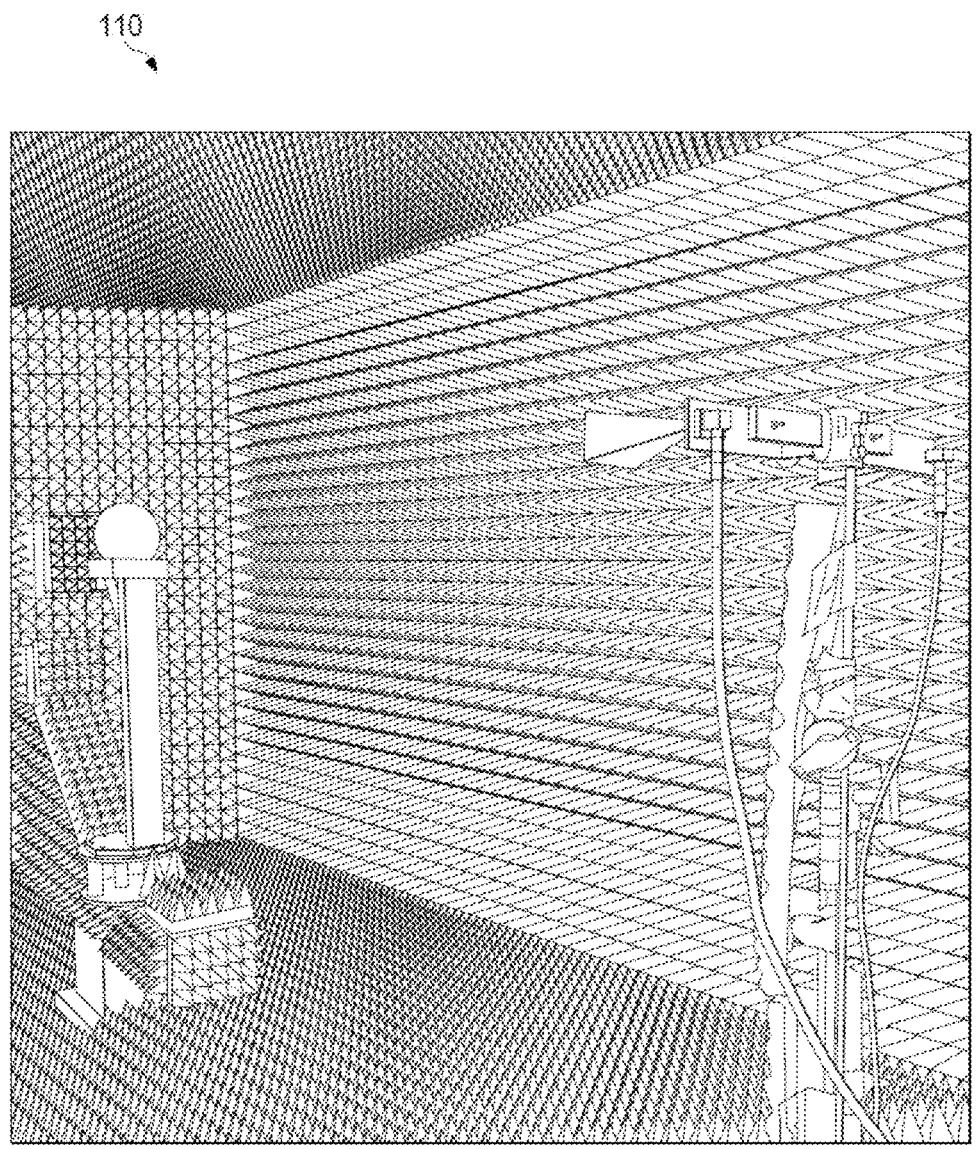
FIG. 1B is a picture of a setup to perform measurements inside an anechoic chamber.

FIG. 1A is a picture 100 of a setup to perform measurements without an anechoic chamber. FIG. 1B is a picture 110 of a setup to perform measurements inside an anechoic chamber.

If an ideal, customized chamber is not available and the clutter response is affecting RCS extraction accuracy, signal processing techniques like vector background subtraction and time-gating are commonly implemented in post-processing to overcome these imperfect measurement setups. While background clutter cancellation can be used in any scenario to improve measurement accuracy, time-gating relies on the assumption that the OUT is entirely temporally separated from all the other nearby scatterers. High-bandwidth systems may be able to isolate the main lobes of each scatterer's return, but the range sidelobes of one return can still overlap with the OUT's main lobe. This differentiation becomes even more complicated with distributed targets.

Several methods have been proposed to mitigate range sidelobes for other radar applications. For example, the CLEAN algorithm separates targets by canceling one target at a time. However, this algorithm and its adaptations assume that each target is a point scatterer. This assumption is not valid for wideband RCS range profiles where even a sphere's return appears distributed due to a creeping wave. Therefore, the CLEAN algorithm cannot correctly reconstruct the range profile for RCS measurement applications. Other sidelobe suppression methods in radar include the Yule-Walker autoregressive method and LS algorithms; however, these methods require a high SNR. The far-field criterion and spherical spreading loss significantly limit the SNR achieved in a realistic RCS measurement setup. Furthermore, LS solutions misestimate the range profile when there is a significant scatterer within the processing window prior to the initial range bin.

Disclosed herein is an algorithm that uses APC, is based on RMMSE, and can be used as part of the post-processing toolkit. In general, APC is a robust method to adaptively suppress sidelobes, which is ideal for collocated/closely spaced target scenarios. This technique is used because it aims to correctly estimate the complex magnitude of the scatterers within the range profile rather than minimizing the peak-to-sidelobe ratio like many other sidelobe reduction techniques. This distinction is important because the complex magnitude of the OUT's range response must be preserved to yield accurate frequency-domain results. The traditional APC method has been adapted to accommodate an SFCW signal model, and the math and implementation strategies are provided. First, the proposed algorithm is applied to measured data in a traditional RCS measurement setup for validation. Next, a small RCS target (sphere) is placed near a large RCS target (metal plate) such that the sidelobes of the large scatter mask the smaller scattering target, and the proposed algorithm is applied. By applying the proposed RMMSE algorithm, the average error of the extracted sphere RCS is reduced by 0.5 dB in the sphere-only measurement and 4.71 dB when a metal plate is placed directly behind the sphere.

The post-processing method achieves highly-accurate RCS measurements in challenging test environments. By applying the SFCW APC algorithm, a range-dependent filter is created to iteratively estimate the range profile and suppress sidelobes, allowing for temporal separation of the scatterers and accurate RCS estimation. To validate the concept, the RCS of a 15.2 cm sphere is extracted in two measurement configurations (with and without a large nearby dominating scatterer). The matched filter data processing accuracy is compared to the APC technique. Implementation of APC in post-processing yields a 71.2% improvement in average RCS error compared to filter data processing in the sphere-only measurement and an 88.2% improvement in the presence of a metal plate.

The disclosed embodiments have a multitude of applications, including RCS extraction, biomedical imaging, and target classification. The RCS extraction has been done several times with multiple collected datasets validating the testing and overall theory. Biomedical imaging applications include cancer detection. Target classification applications include pedestrian detection for automotive radar.

I. RCS Extraction

The VNA can be treated like an SFCW radar, which transmits a series of frequency tones (or steps) spaced by $\Delta f$ Hertz over a measurement interval. Therefore, many classic SFCW radar principles may be applied to extract information and eliminate clutter from the VNA measurements. The RCS is extracted from an $S_{21}$ measurement with the radar range equation, given by:

$$\frac{P_r}{P_t} = \frac{G^2 \lambda^2 \sigma}{(4\pi)^3 R^4 L}, \quad (1)$$

where $P_r$ and $P_t$ are the power received and transmitted at port two and port one of the VNA, respectively, G is the gain of the antenna, $\lambda$ the wavelength, $\sigma$ is the RCS, R is the distance to the OUT, and L is the loss in the system. The variables that depend on the OUT inside the chamber are $P_r$ and $\sigma$. The remaining variables are extracted through vector background subtraction, time-gating, and calibration set creation.

Other important radar principles are applied when analyzing the range profile of the measurement. For example, the range resolution ($\Delta R$) is given by:

$$\Delta R = \frac{v_p}{2B}, \quad (2)$$

where $v_p$ is the velocity of propagation and B is the bandwidth, defined as the difference between the largest and smallest transmitted frequency. The frequency step size ($\Delta f$) determines the maximum unambiguous range ($R_{max}$) as follows:

$$R_{max} = \frac{v_p}{2\Delta f} = \frac{N v_p}{2B}, \quad (3)$$

where N is the number of individual frequency steps. Any scatterer that lies beyond $R_{max}$ will alias down into a range bin between 0 and $R_{max}$, causing distortions in the range profile. It is important to note that $v_p$ is slower than the speed of light in the dielectric coaxial cables commonly used in measurements. This slower velocity of propagation will lead to a smaller range swath than if the speed of light is used for the unambiguous range calculations.

For the measurements collected with a VNA operating as an SFCW radar described above, a single frequency is transmitted and received before moving on to the next frequency point. The VNA collects samples in the time domain, and then the VNA converts the samples to the frequency domain onboard before outputting the data. The output file of the VNA is frequency domain I/Q data.

Alternatively, OFDM radar transmits and receives many frequency points simultaneously. Thus, OFDM radar can be used as a more efficient alternative to SFCW radar collection. An SDR can be used as an OFDM radar system. The SDR collects samples in the time domain and outputs them unaltered, so the output file is time-domain I/Q data. Then the samples must be converted to the frequency domain in post-processing. However, the time-domain samples can be converted to the frequency domain onboard the SDR. The same benefits of APC are realized for measurements collected with an OFDM waveform as those already shown for an SFCW waveform.

Background subtraction aims to eliminate the returns of all scatterers except for the OUT. First, the chamber is measured with no OUT. Then, this empty chamber measurement is subtracted from each OUT measurement. Background subtraction does not eliminate all clutter because of shadowing effects, so time-gating is applied to further isolate the OUT's return. The first step of time-gating is converting the background-subtracted measurement to the time domain. Traditionally, the time-domain signal, or range profile, is estimated with an IFFT. A window is used to filter the range profile to include only the range bins that contain the OUT and suppress the signals from all other range values. The window shape is designed to include the entire return from each OUT and suppress edge effects inherent to Fourier analysis.

The time-gated measurement is converted back to the frequency domain with an FFT. This background subtraction and time-gating process are repeated for each OUT and a calibration object. It should be noted that the calibration object has a known RCS value, either through calculation, simulation, or previous measurement. Thus, the calibration set is created by subtracting the time-gated measurement of the calibration object from the "true" RCS of the calibration object. This set contains all the variables in (1) that do not depend on the OUT. Finally, the calibration set is subtracted from the time-gated OUT measurement to extract the OUT's RCS.

Because the time duration of the frequency domain measurement is finite, the time-domain response of a point target is a sinc function instead of a perfect delta function. Thus, after taking the IFFT, the main lobe or sidelobes of a nearby scatterer may interfere with the main lobe of the desired target. Thus, because precision RCS extraction relies on temporal separation between the OUT and any other clutter source, some RCS measurement techniques do not perform well in this scenario.

The RCS of an object depends on its shape, material, orientation, and size relative to the incident wavelength. The geometry plays a role in how much of the transmitted wave is reflected toward the antennas. Flat objects oriented broadside to the antennas will reflect more power to the antennas. Materials with low reflectivity can also have a meaningful RCS when oriented broadside to the antennas. For example, support structures made of foam are tapered to direct reflections away from the antennas. The proposed work includes two canonical shapes with greatly different responses: a rectangular plate and a sphere. A broadside plate directs most of the incident wave back towards the antennas, while the sphere scatters the incident wave in many directions. At 12 GHz, the 31 cm×36.5 cm metal plate has an RCS of 24 dBsm, and the RCS increases with frequency. On the other hand, a 15.2 cm diameter sphere's RCS varies slightly with frequency, but the average RCS is calculated with the Mie series to be −17.2 dBsm. Stressing scenarios involving these scatterers are considered below.

II. Range Profile Estimation

The matched filter for SFCW waveforms is the IFFT, which maximizes the output SNR after processing. The SFCW waveform is a discretized rectangle function in the frequency domain, so applying the IFFT to a return from a point target will yield a sinc function with a peak sidelobe level of −13 dB. However, radar systems often require much more than 13 dB of dynamic range. Thus, a smaller target may be masked by a more prominent target's sidelobes in the range profile.

Figure 2:
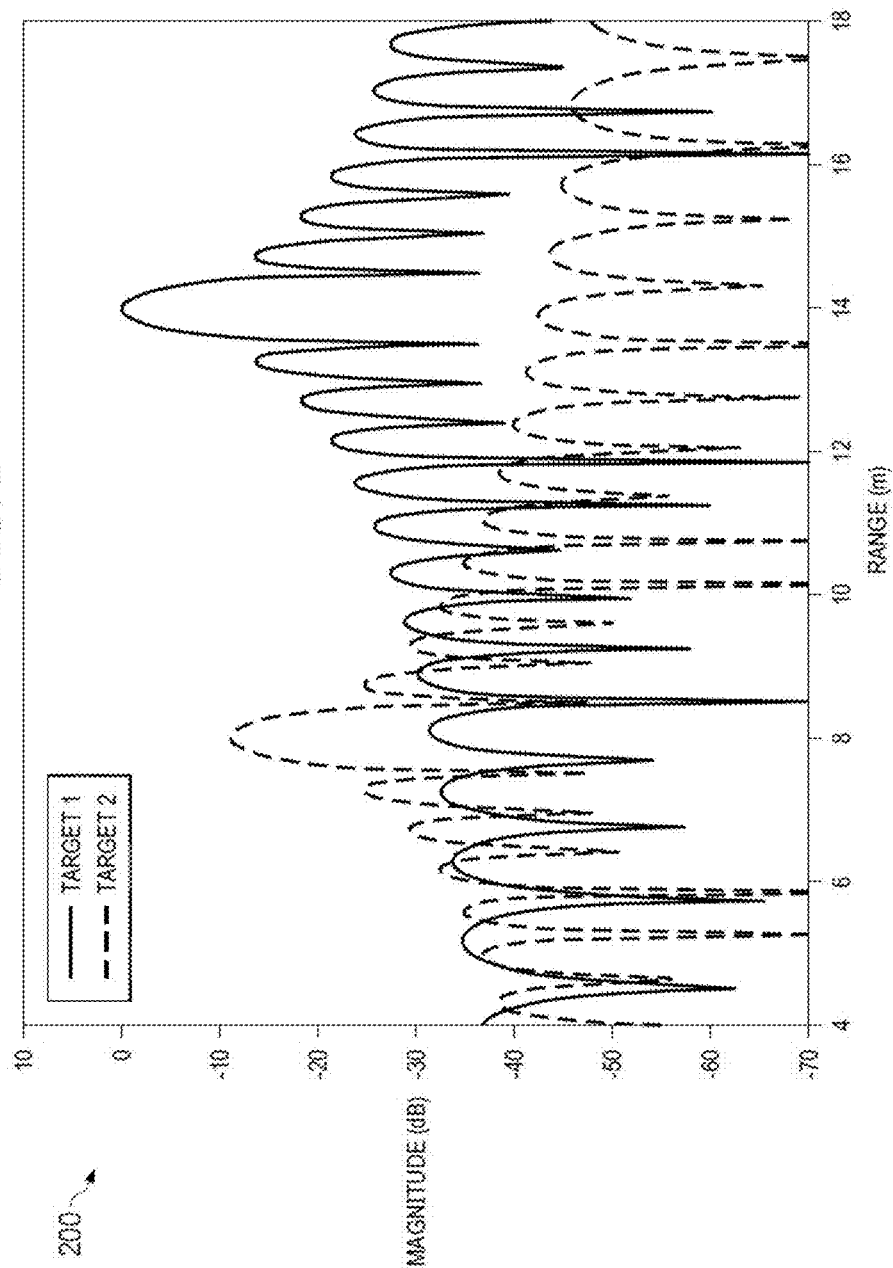
FIG. 2 is a graph of the individual matched filter outputs of the two targets with a significant range separation.
Figure 3:
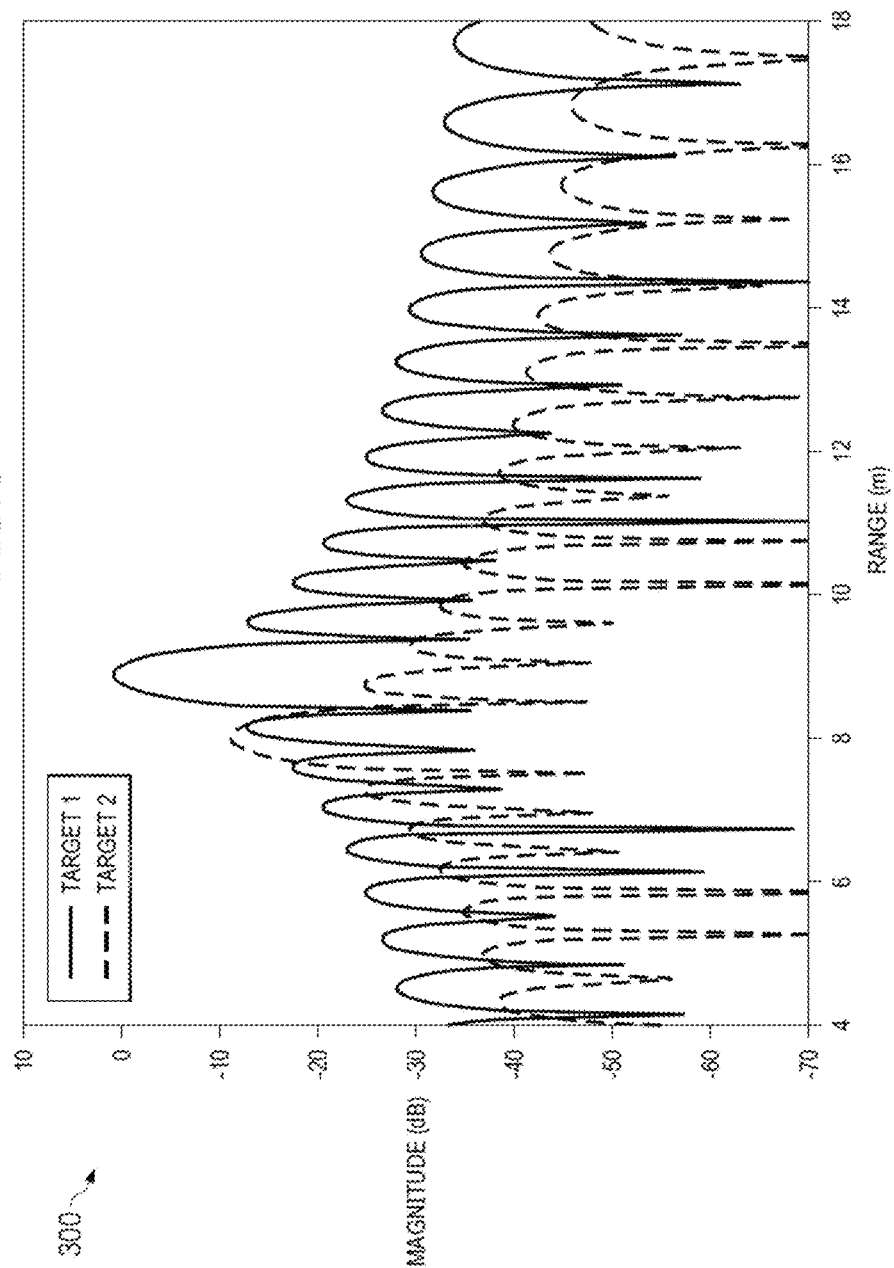
FIG. 3 is a graph of the individual targets' matched filter outputs when the targets are closer in range.

To illustrate target masking, two point targets of different sizes are simulated at two separate distances. FIG. 2 is a graph 200 of the individual matched filter outputs of the two targets with a significant range separation. FIG. 3 is a graph 300 of the individual targets' matched filter outputs when the targets are closer in range. FIG. 4 is a graph 400 of the composite matched filter outputs when both targets are simulated together.

When the targets are well-separated in range, the peaks from both scatterers are visible. However, when the targets are closer together, it is impossible to determine where the peak of the smaller target occurs, even though the simulation's resolution is fine enough to separate the main lobes of each target's response. Thus, time-gating may not be able to separate the OUT from clutter even if the range resolution given by (2) is sufficient.

A. Signal Model

A model of the SFCW signal is further analyzed to develop an alternative estimate of the range profile. An SFCW radar operates by transmitting a single frequency and recording the ratio of the received power relative to the transmitted power at that frequency. The radar then repeats the process for each frequency point until the desired frequency span is populated. The sampled version of the transmitted SFCW waveform starting at some initial frequency ($f_o$) with a frequency step size $\Delta f$ can be written as $$s = [e^{j2\pi 0} e^{j2\pi(f_0+\Delta f)} \ldots e^{j2\pi(F_0+(N-1)\Delta f)}]^T \quad (4)$$

The range profile impulse response (x(t)) is defined as $$x(l) = [x(l)x(l-1) \ldots x(l-N+1)]^T \quad (5)$$

where $\lambda$ is the range bin index and N is the number of samples in the transmitted waveform. The length-N demodulated receive signal ($y(\lambda)$) is then defined as $$y(l) = A^T(l)s + v(l), \quad (6)$$

where $$A(\ell) = \begin{bmatrix} x(\ell) & x(\ell+1) & \ldots & x(\ell+N-1) \\ x(\ell-1) & x(\ell) & \ddots & \vdots \\ \vdots & \ddots & \ddots & x(\ell+1) \\ x(\ell-N+1) & \ldots & x(\ell-1) & x(\ell) \end{bmatrix} \quad (7)$$

$$= \begin{bmatrix} \alpha_{11} e^{j2\pi f_1 \tau_1} & \alpha_{12} e^{j2\pi f_1 \tau_2} & \ldots & \alpha_{1L} e^{j2\pi f_1 \tau_L} \\ \alpha_{21} e^{j2\pi f_2 \tau_1} & \alpha_{22} e^{j2\pi f_2 \tau_2} & \ldots & \alpha_{2L} e^{j2\pi f_2 \tau_L} \\ \vdots & \vdots & \ddots & \vdots \\ \alpha_{N1} e^{j2\pi f_N \tau_1} & \alpha_{N2} e^{j2\pi f_N \tau_2} & \ldots & \alpha_{NL} e^{j2\pi f_N \tau_L} \end{bmatrix} \quad (8)$$

is a collection of N sample-shifted snapshots of the radar impulse response, where $\tau_l$ is the time delay for the signal to propagate to the $l^{th}$ range cell and return to the radar, $\alpha_{nl}$, is a scalar magnitude as a function of frequency n and range cell l, L is the total number of range bins, and $f_n$ is the $n^{th}$ frequency in the transmitted waveform. The range-dependent noise vector (v(l)) is defined as $$v(l) = [v(l)v(l+1) \ldots v(l+N-1)]^T \quad (9)$$

where v(l) is additive noise. The matched filter output ($\hat{x}_{MF}(1)$) is then $$\hat{x}_{MF}(1) = s^H y(l) = s^H A^T(l)s + s^H v(l) \quad (10)$$

Examining (10) shows that any large off-diagonal elements of A(l) will yield range sidelobes capable of masking smaller targets when the matched filter is applied. In other words, for a given range profile index l, nearby large values in A(l) affect the magnitude of $\hat{x}_{MF}(\Lambda)$ when added together during matrix multiplication.

B. Adaptive Pulse Compression

Embodiments implement the RMMSE algorithm on measured data with the SFCW waveform. This Bayesian approach adaptively estimates a matched filter for each range cell based on the received signal. The filter is refined through several iterations until the noise level limits the range profile estimation accuracy. The RMMSE algorithm is applied by replacing the matched filter $s^H$ in (10) with a range-dependent MMSE filter ($w^H(l)$). The MMSE cost function $$J(l) = E[|x(l) = w^H(l)y(l)|^2] \quad (11)$$

is solved for each range bin l. If the range cells are uncorrelated with each other and with the noise, then the MMSE filter is given by:

$$w(l) = \rho(l)C(l) + R)^{-1}s \quad (12)$$

where $$\rho(l) = |x(l)|^2 \quad (13)$$

and R is the N×N noise covariance matrix. With white noise, R is the diagonal matrix $\sigma^2 I$, the initial range profile estimate into short segments and finding the segment with the smallest variance. The segments are small enough that at least one of them only contains noise. The signal covariance matrix (C(l)) is given by:

$$C(\ell) = \sum_{n=-N+1}^{N-1} \rho(\ell+n) s_n s_n^H, \quad (14)$$

where $s_n$ is created by shifting s by n samples and zero-filling the rest of the vector. Because C(l) is a circulant matrix, the equation can be simplified as:

$$C(\ell) = A \begin{bmatrix} \rho(1) & \ldots & 0 \\ \vdots & \ddots & \vdots \\ 0 & \ldots & \rho(L) \end{bmatrix} A^H. \quad (15)$$

For the first iteration, the MMSE pulse compression filter is constant for all values of l. Given the SFCW waveform, $w_0$ is the IFFT of y. Because the VNA demodulates the received signal to baseband, $f_0$, in this case, is 0 Hz. Estimating the power ($\rho(l)$), computing a new MMSE filter, and updating the range profile are repeated P times, where P is the number of iterations. For this application, the exponent on $\sigma_n$ and $\rho(l)$ is reduced from 2 to 1.7 to prevent ill-conditioning during matrix inversion.

Figure 5:
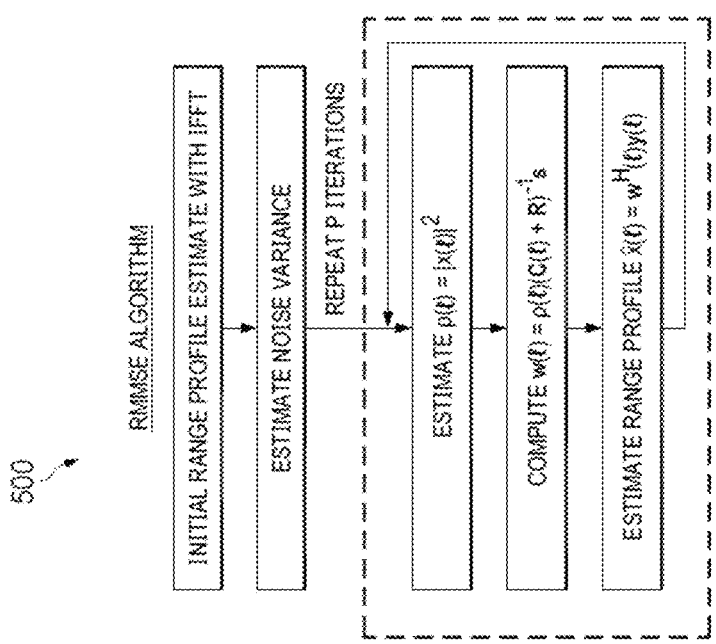
FIG. 5 is a flowchart illustrating the RMMSE algorithm.

FIG. 5 is a flowchart 500 illustrating the RMMSE algorithm. Each iteration pushes the range sidelobes down closer to the noise floor until the sidelobes cannot move any lower into the noise floor. Additional iterations may not improve the range profile estimate. Thus, P depends on the measurement's SNR. The RMMSE algorithm is included in the RCS extraction process.

Figure 6:
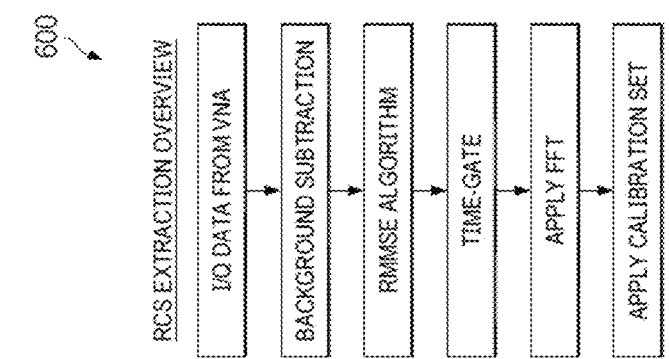
FIG. 6 is a flowchart illustrating the overall RCS extraction method.

FIG. 6 is a flowchart 600 illustrating the overall RCS extraction method. These steps are repeated for each OUT of interest.

Figure 7:
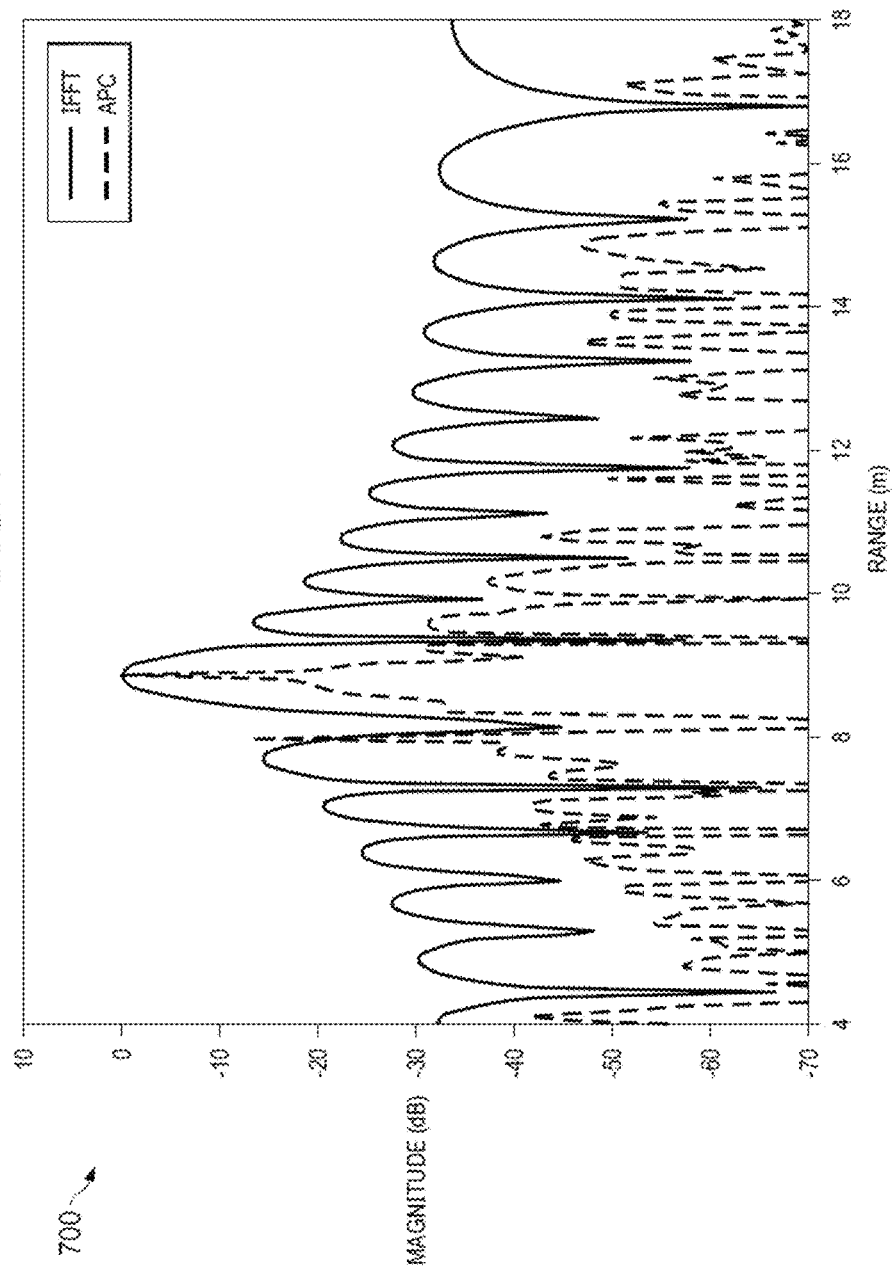
FIG. 7 is a graph showing the results of applying the methodology to the simulated small separation scenario in FIG. 4.

FIG. 7 is a graph 700 showing the results of applying the methodology to the simulated small separation scenario in FIG. 4. The graph 700 illustrates the RMMSE algorithm's impact on a range profile. The results are after three iterations of the RMMSE algorithm. As can be seen, the return from the small target at 2000 m is not visible with matched filtering labeled as "IFFT," indicating there is only one scatterer present, which is incorrect. However, both targets are revealed and easily distinguishable after applying the APC algorithm.

To further gain confidence in the algorithm, APC is applied to a measurement scenario similar to the simulation in FIG. 7. The measured data are captured from a scene containing a sphere at a range of 3.75 m and a metal plate at 3.95 m. Measurements are taken with a 14-16 GHz SFCW waveform.

Figure 8:
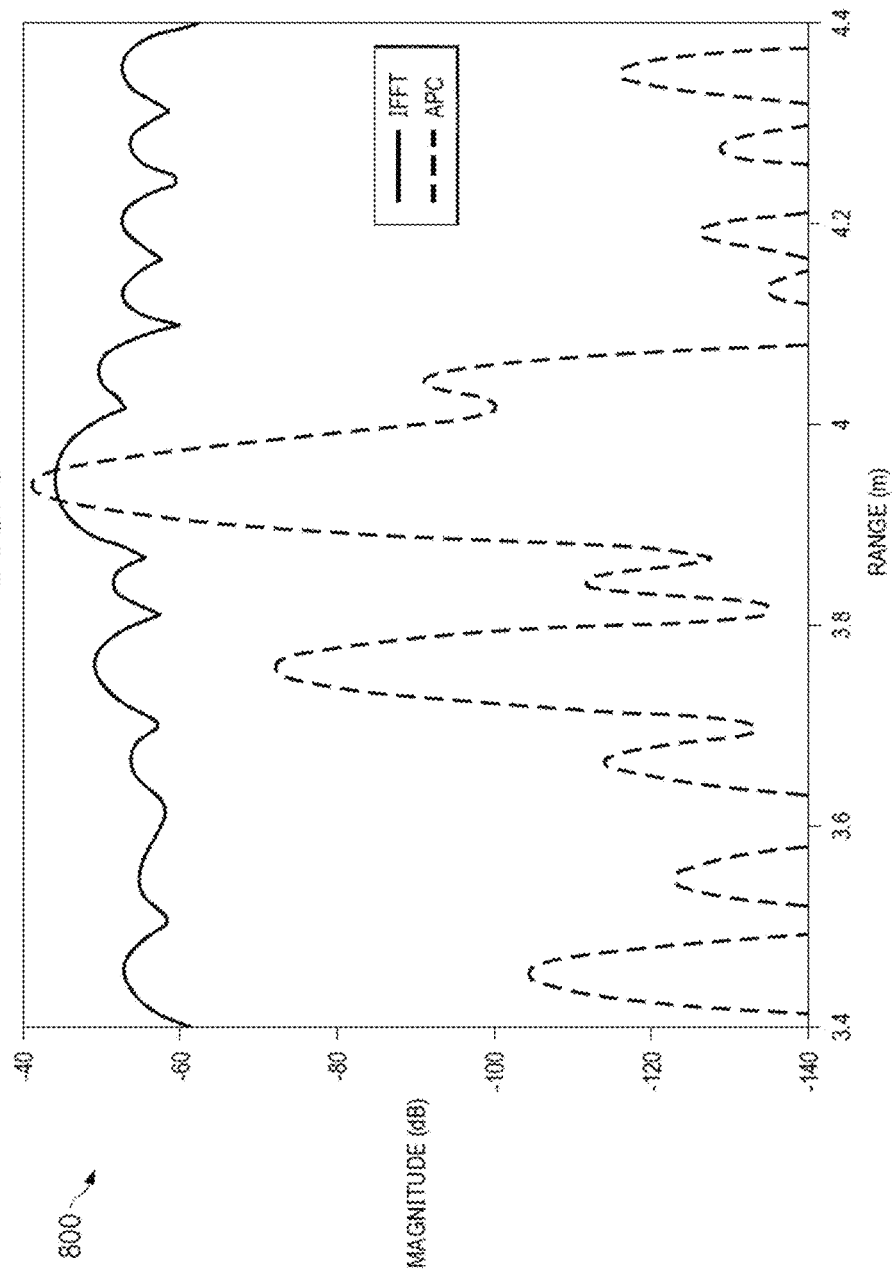
FIG. 8 is a graph comparing the range profiles generated with the matched filter and with three iterations of APC.

FIG. 8 is a graph 800 comparing the range profiles generated with the matched filter and with three iterations of APC. It is difficult to distinguish where the two targets are located without APC. However, after three iterations of the RMMSE algorithm, the sidelobes are suppressed to reveal the separation between the two target returns. Similar results are expected for a range profile with multiple targets as APC performs well in densely-populated range profiles.

In general, these two scenarios illustrate the potential of APC in the application of RCS measurements. Without separation between the two target returns in the range profile, the RCS of a single target cannot be isolated with time-gating. By suppressing the sidelobes to separate the target returns, time-gating can effectively filter out the desired return from the undesired scatterers and accurately extract an OUT's RCS, which is not possible with matched filtering. While these scenarios are helpful visualizations, in even less severe situations where a lower sidelobe overlaps with the OUT return, the RCS measurement accuracy is affected by the constructive or deconstructive interference from the sidelobe. Below, the method is extended to show its efficacy in highly-accurate RCS extraction in cluttered environments.

III. Test Setup

To evaluate the proposed methodology compared to other processing, two OUT configurations are considered. First, a 15.2 cm sphere is measured from 10-16 GHz with two wideband dual-ridge SH2000 antennas from Microwave Vision Group connected to a Keysight N9928A FieldFox handheld VNA indoors at the University of Oklahoma as shown in FIG. 1A. A 30.5 cm sphere is used to create the calibration set. Next, the OUT is placed on a foam pedestal 2.8 m from the antennas. Foam absorbers are placed on the ground in front of the OUT to minimize ground reflections, but the indoor environment still contains significant clutter.

Figure 9:
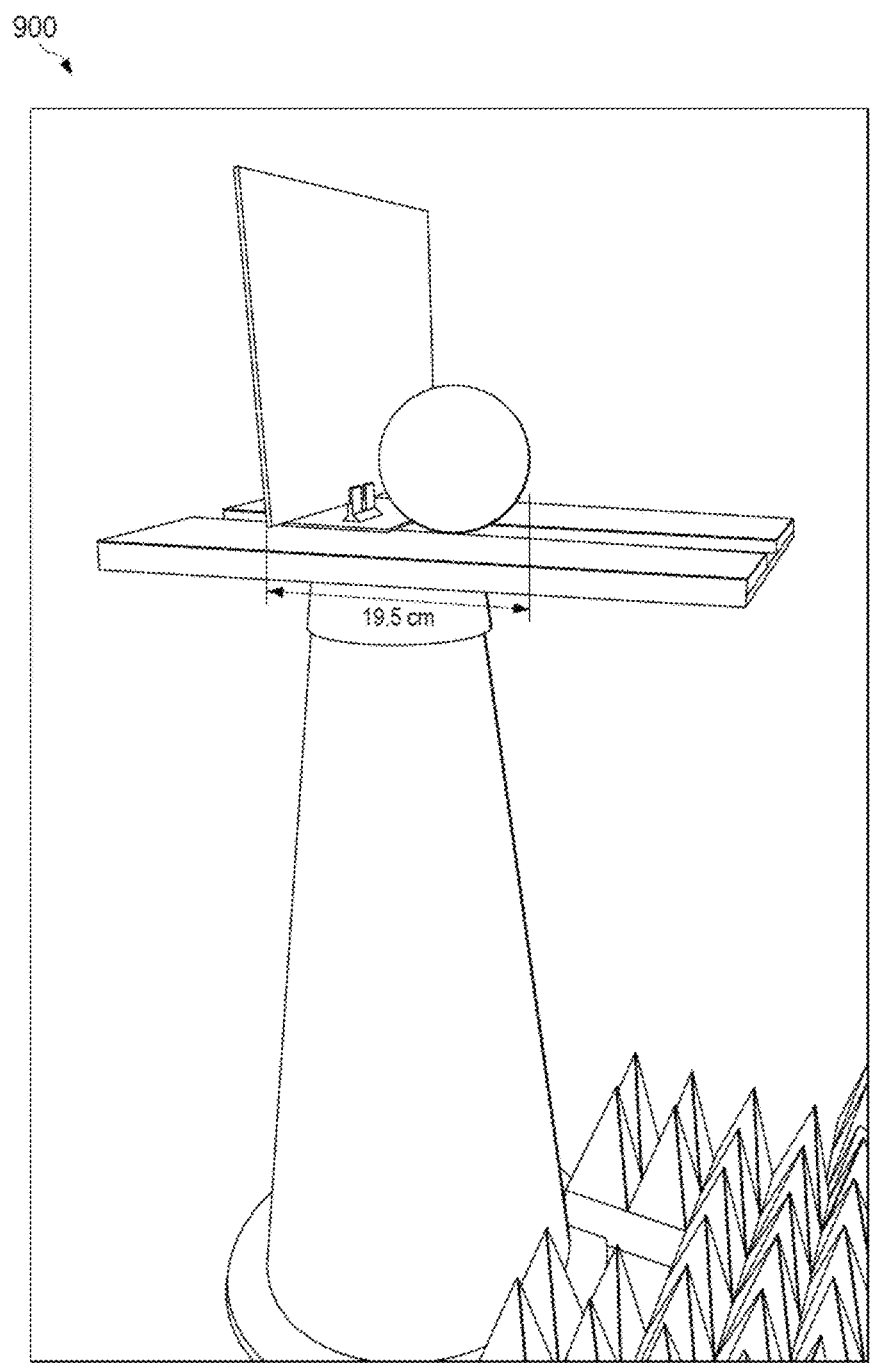
FIG. 9 is a picture of a test setup with an aluminum plate.

FIG. 9 is a picture of a test setup 900 with an aluminum plate. Specifically, next, a 31 cm×36.5 cm aluminum plate is placed 4.3 cm behind the 15.2 cm sphere to exaggerate the small separation scenario as shown in FIG. 9. A total distance of 19.5 cm is between the front of the sphere and the front of the plate. Finally, the measurement process shown in FIG. 6 is performed for both scenarios. A Tukey window, which has a flat passband and cosine-tapered edges, is used for time-gating to include the full target return while still suppressing edge effects.

IV. Measurements and Analysis

First, the RCS of the 15.2 cm sphere is extracted without the metal plate behind it; however, the range profile is estimated with and without the RMMSE algorithm stage to compare the impact of APC on the accuracy of RCS extraction.

Figure 10:
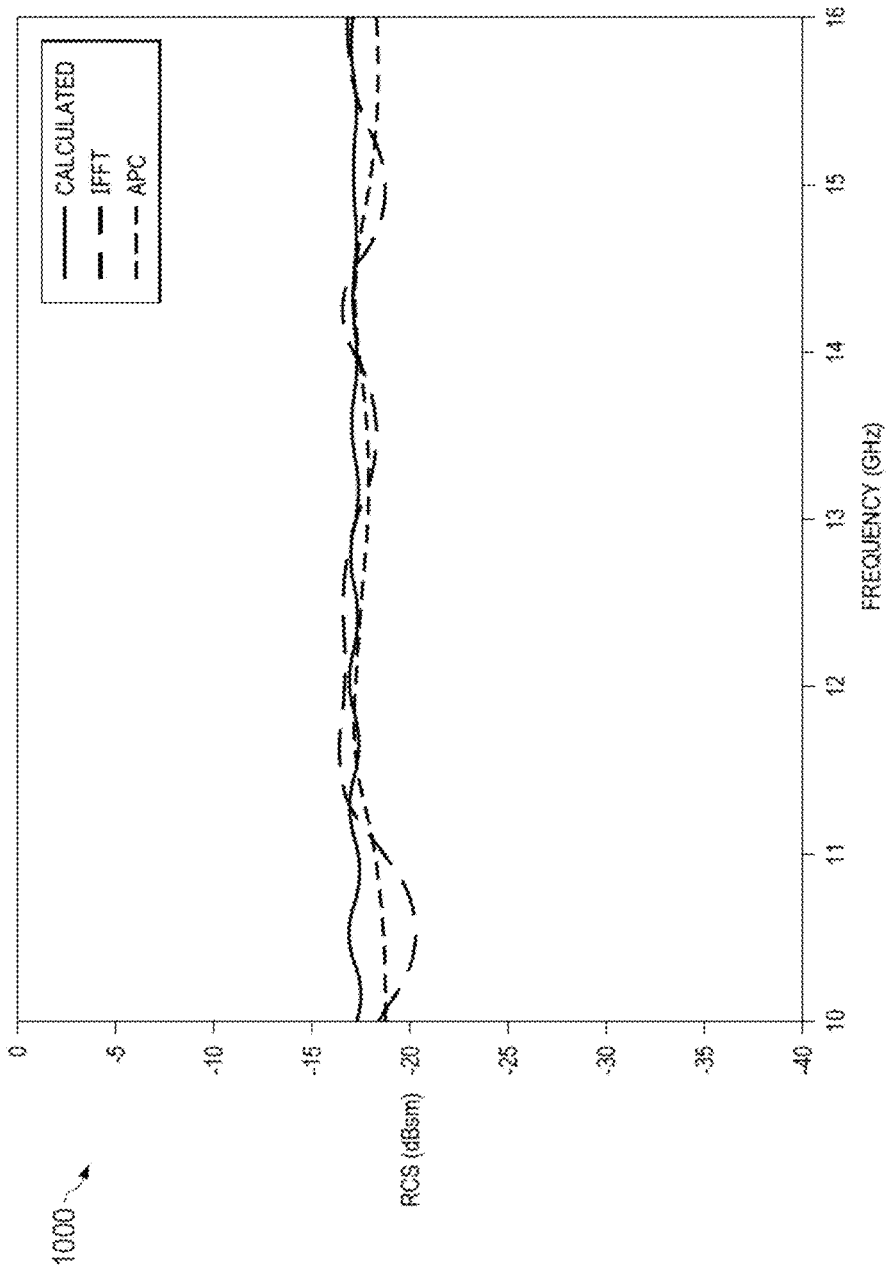
FIG. 10 is a graph comparing average errors for different scenarios.

FIG. 10 is a graph 1000 comparing average errors for different scenarios. Specifically, the graph 1000 shows a measured RCS of a 15.2 cm sphere calibrated with a 30.5 cm sphere processed with the same time-gating window for IFFT-generated and APC-generated range profiles compared to analytically calculated values. After background subtraction and time-gating with the IFFT, the average error of the measured 15.2 cm sphere RCS is 18.35%. For a fair comparison with the same noise characteristics, the same time-gating window is applied to a range profile estimated with APC, and the average error is reduced to 9.77% as seen in FIG. 10. Then, the width and taper sharpness of the window are adjusted to minimize the error for the range profile created by the RMMSE algorithm. In this case, a window with a more gradual taper may be used because the OUT's return is more isolated.

Figure 11:
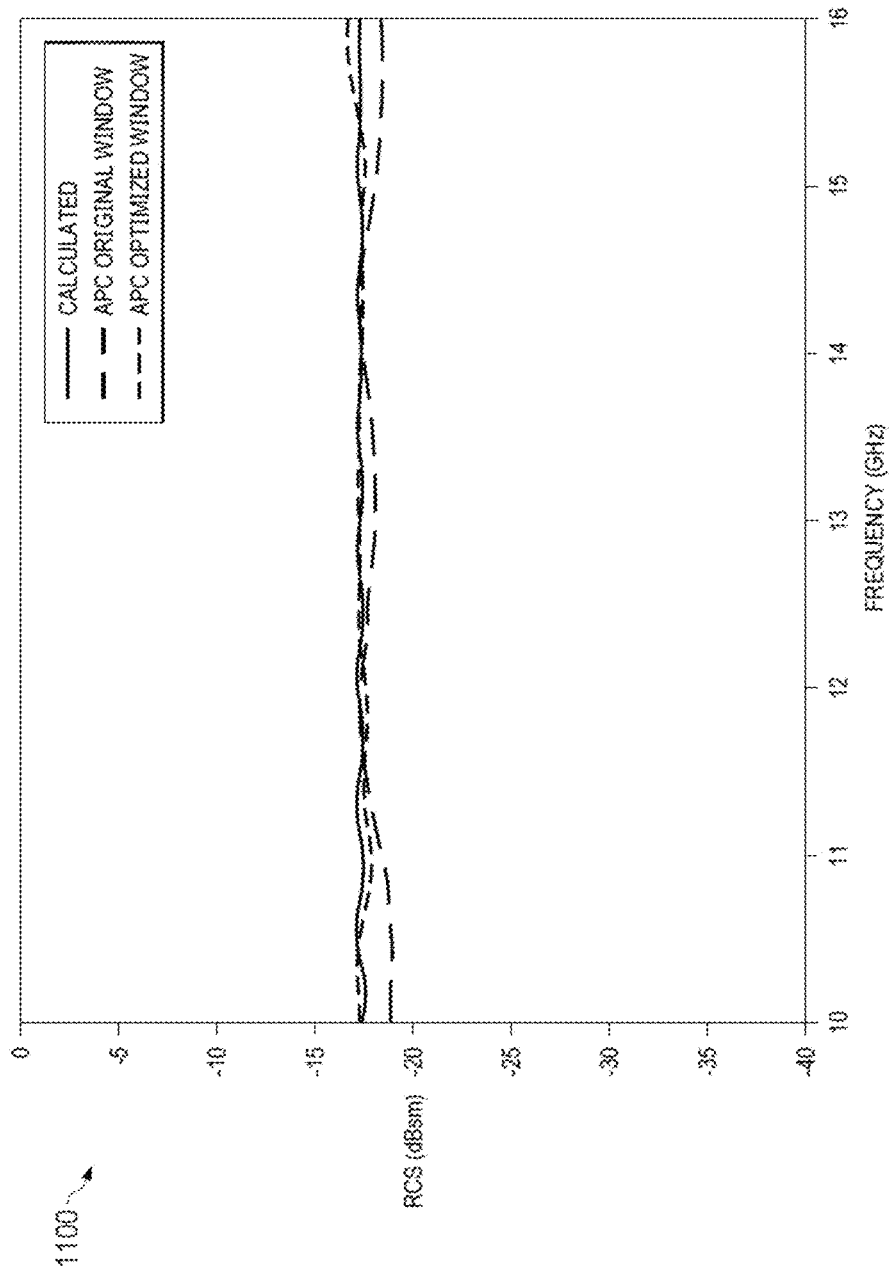
FIG. 11 is a graph showing error reduction based on window replacement.

FIG. 11 is a graph 1100 showing error reduction based on window replacement. Specifically, the graph 1100 shows a measured RCS of a 15.2 cm sphere calibrated with a 30.5 cm sphere processed with APC with the window used in FIG. 10 to an optimized window compared to analytically-calculated values. By replacing the time-gating window optimized for the IFFT range profile with a broader window optimized for the range profile after RMMSE, the average error is further reduced to 5.29% as shown in FIG. 11. These window adjustments raise the error on the IFFT range profile because this range profile estimate is more sensitive to changes in window size and shape.

Next, the RCS of the 15.2 cm sphere is extracted with the metal plate behind it. This scenario is more complicated since the sphere return needs to be isolated from the overall distributed target return (i.e., sphere plus plate).

Figure 12:
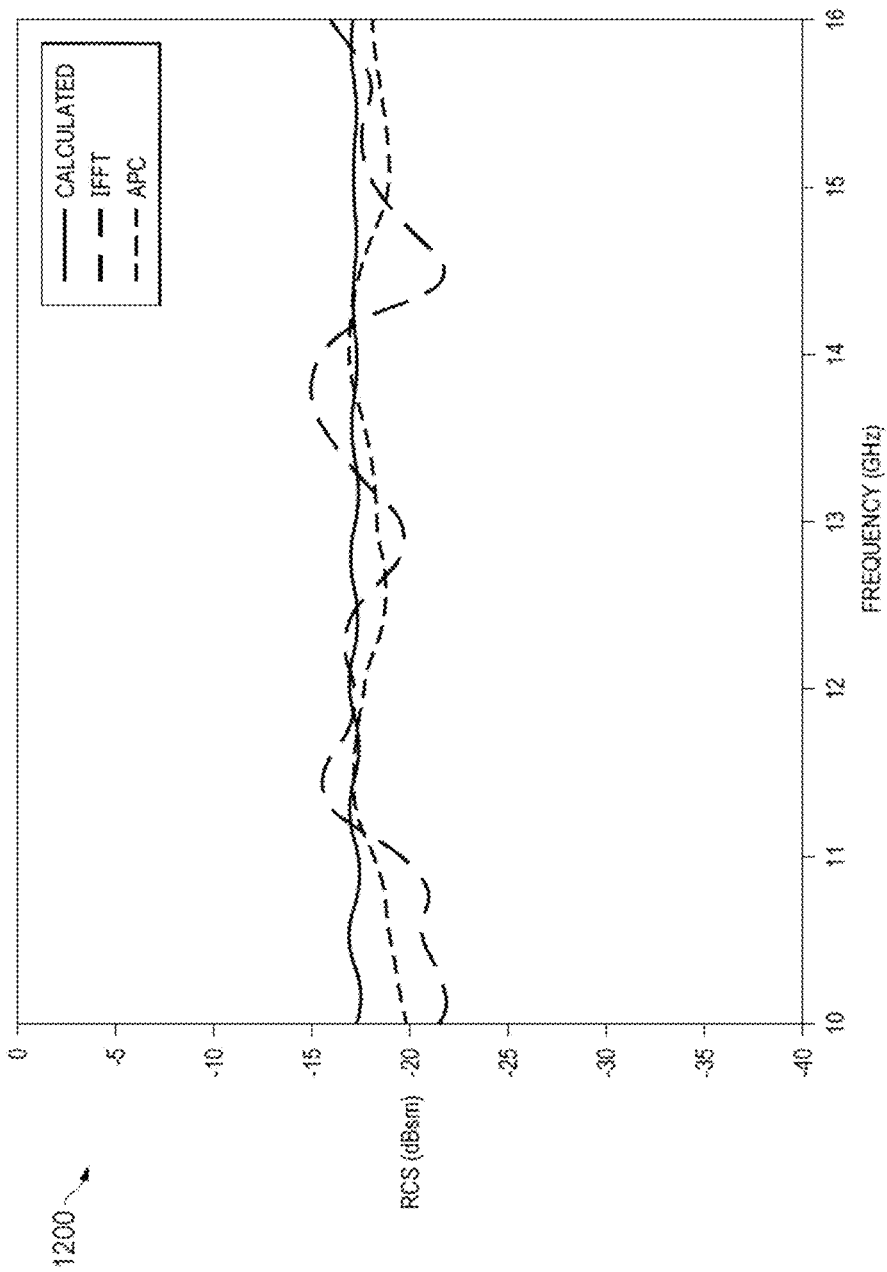
FIG. 12 is another graph comparing average errors for different scenarios.

FIG. 12 is another graph 1200 comparing average errors for different scenarios. Specifically, the graph 1200 shows a measured RCS of a 15.2 cm sphere placed 17.8 cm in front of a metal plate calibrated with a 30.5 cm sphere processed with the same time-gating window for IFFT-generated and APC-generated range profiles compared to analytically calculated values.

Figure 13:
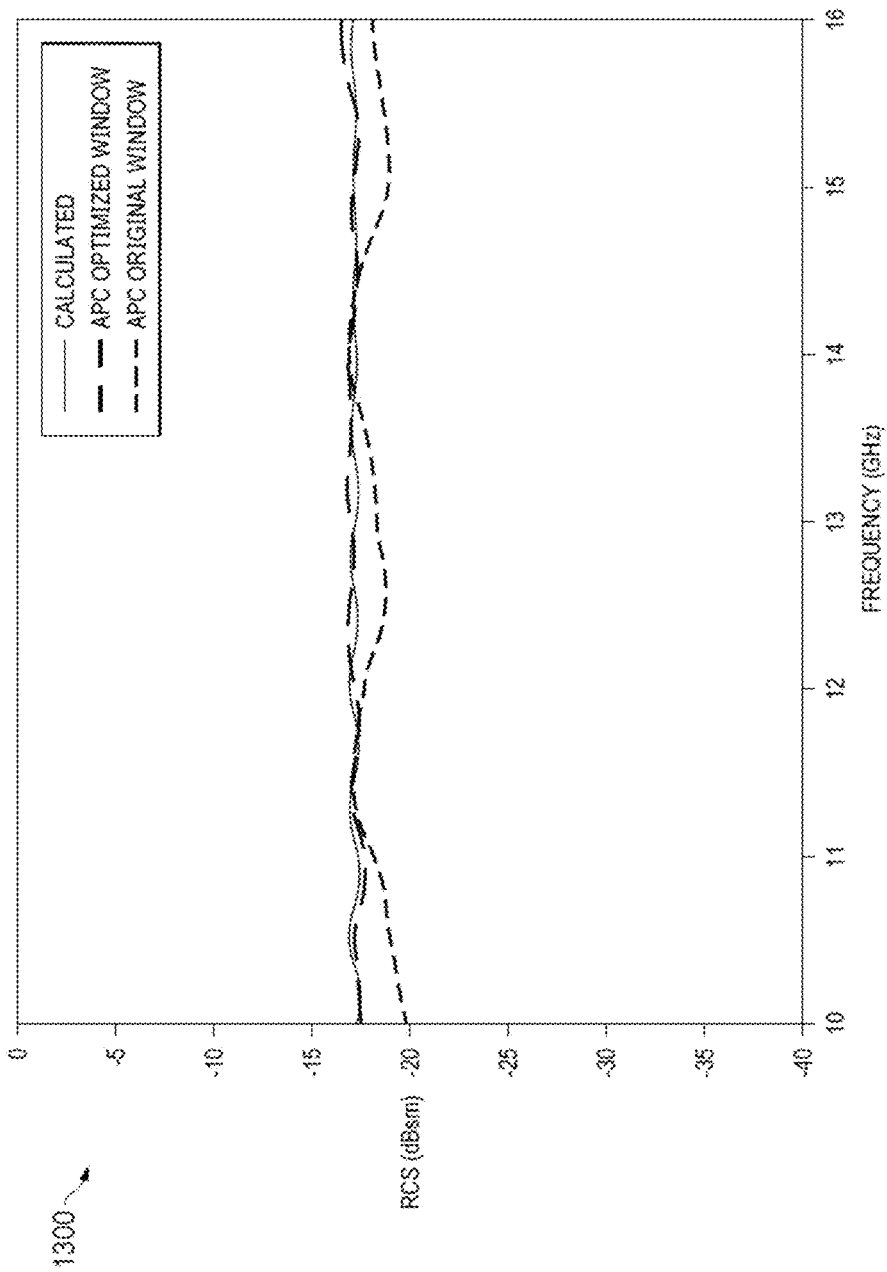
FIG. 13 is yet another graph comparing average errors for different scenarios.

FIG. 13 is yet another graph 1300 comparing average errors for different scenarios. Specifically, the graph 1300 shows a measured RCS of a 15.2 cm sphere placed 17.8 cm in front of a metal plate calibrated with a 30.5 cm sphere processed with APC with the window used in FIG. 12 and an optimized window compared to analytically calculated values.

With a 6 GHz measurement bandwidth, time-gating is able to extract the sphere RCS without APC with an average error of 19.53%. Applying the same window to the RMMSE range profile reduces the error to 13.63% as shown in FIG. 12. By optimizing the window for APC, the error is further reduced to 5.49% as shown in FIG. 13.

Figure 14:
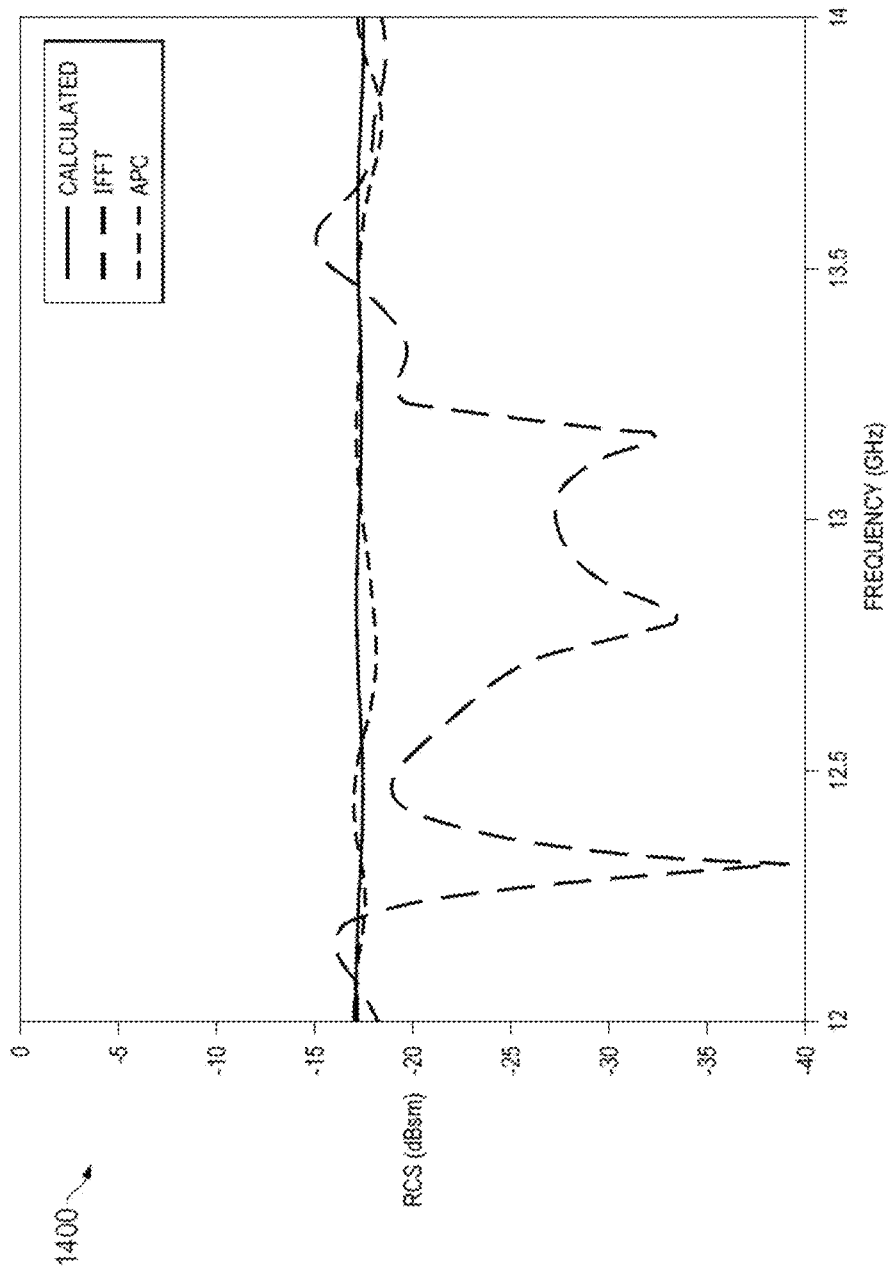
FIG. 14 is yet another graph comparing average errors for different scenarios.

FIG. 14 is yet another graph 1400 comparing average errors for different scenarios. Specifically, the graph 1400 shows the RCS of a 15.2 cm sphere placed 17.8 cm in front of a metal plate measured with 2 GHz of bandwidth calibrated with a 30.5 cm sphere processed with the same time-gating window for IFFT-generated and APC-generated range profiles compared to analytically calculated values.

Figure 15:
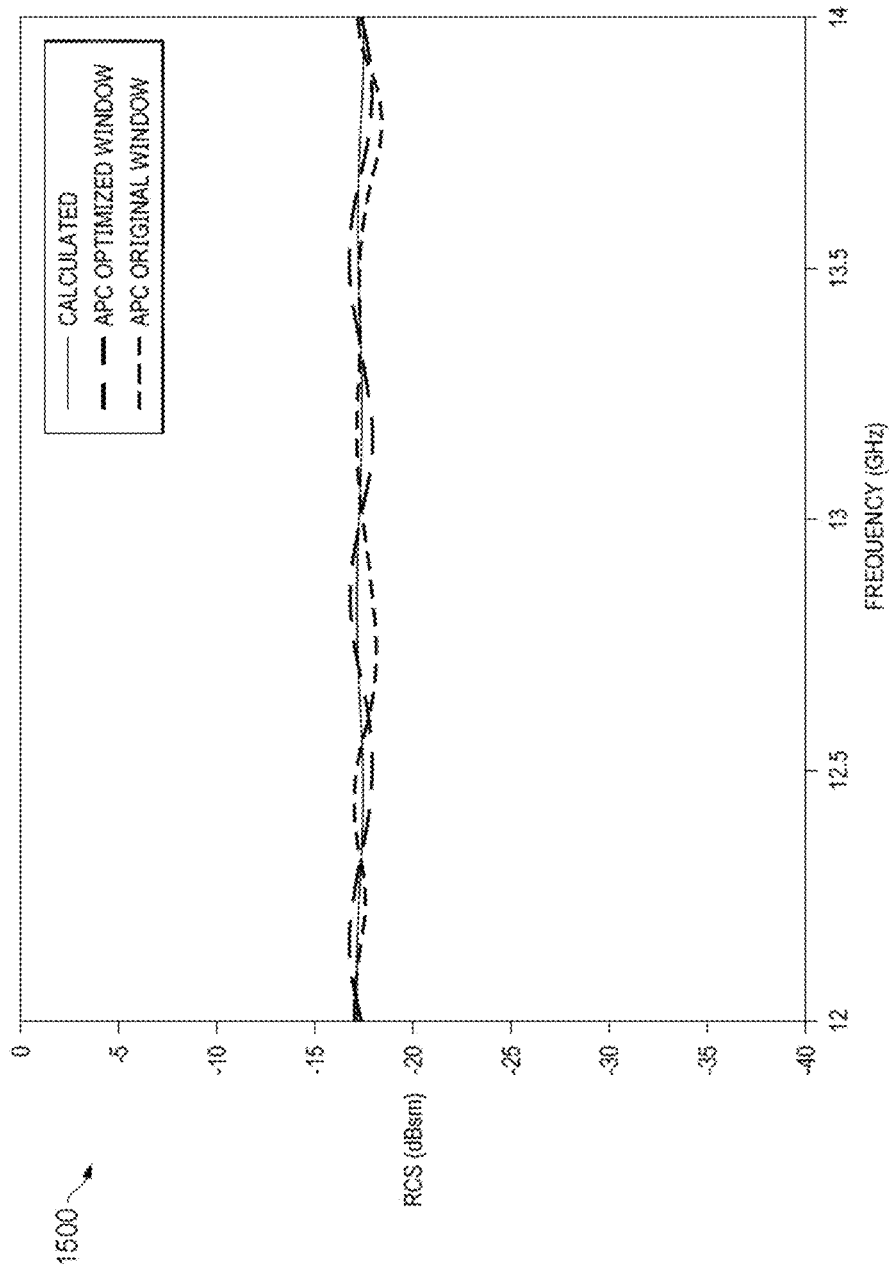
FIG. 15 is yet another graph comparing average errors for different scenarios.

FIG. 15 is yet another graph 1500 comparing average errors for different scenarios. Specifically, the graph 1500 shows the RCS of a 15.2 cm sphere placed 17.8 cm in front of a metal plate measured with 2 GHz of bandwidth calibrated with a 30.5 cm sphere processed with APC with the window used in FIG. 14 and an optimized window compared to analytically calculated values.

When the measurement bandwidth is reduced to 2 GHz, other processing methods cannot accurately extract the sphere's RCS. With an IFFT-optimized window, the average error is 50.78%. Applying the same window to the APC range profile yields an 8.20% error as shown in FIG. 14. Once the window is adjusted for the APC range profile, the average error falls to 6.00% as shown in FIG. 15.

The average error for the IFFT and APC range profiles with their respective optimal windowing are summarized in the Table below.

TABLE

Average error of 15.2 cm sphere RCS with and without a metal plate in the scene calibrated with a 30.5 cm sphere processed with IFFT and APC range profile estimates

| | | Range Profile Estimation | |
| --- | --- | --- | --- |
| | Bandwidth | IFFT | APC |
| No Plate | 6 GHz | 18.35% | 5.29% |
| With Plate | 6 GHz | 19.53% | 5.49% |
| With Plate | 2 GHz | 50.78% | 6.00% |

In all three measurement configurations, APC consistently outperforms matched filtering regarding RCS measurement accuracy. Moreover, with only 2 GHz of bandwidth (or less), APC enables otherwise impossible RCS extraction.

Ultimately, as the cable loss and spherical spreading wave propagation loss increase with frequency, the thermal noise starts to limit the accuracy of the measurement. While the RMMSE algorithm improves measurement accuracy substantially, APC can only suppress the sidelobes down to the noise floor. In this case, SNR is the ultimate bound for the accuracy that can be achieved.

V. CONCLUSION

An adaptive range profile estimation technique improves the accuracy of RCS measurements. This method for range sidelobe suppression enables accurate RCS measurements when the OUT is in close proximity to other scatterers. SFCW radar principles are combined with APC via an RMMSE algorithm to extract the OUT RCS in two stressing scenarios.

Even when a quasi-transparent pedestal and absorbing foam are implemented in an indoor measurement, the RMMSE algorithm improves measurement accuracy by 0.5 dB. Once a dominant scatterer is introduced behind the sphere, APC outperforms other processing by 4.71 dB (44.78%). APC successfully separated the sphere return from a nearby metal plate to extract RCS in an environment where other processing is unsuccessful, illustrating the efficacy of adaptive range profile estimation techniques in RCS extraction measurements. Specifically, the RMMSE algorithm shows excellent potential to overcome limitations on accuracy in cluttered measurement environments.

Figure 16:
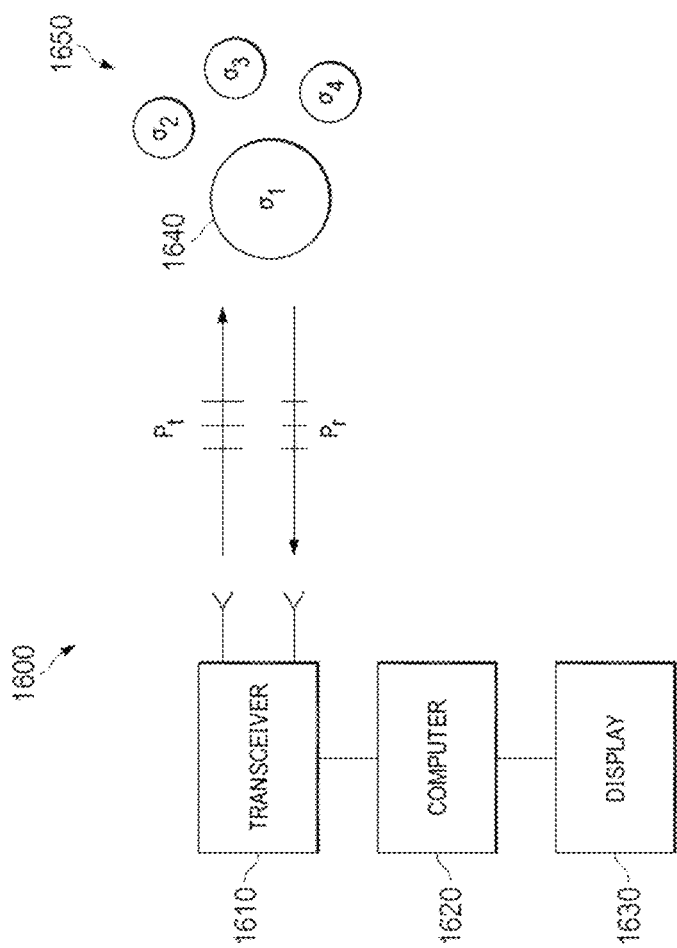
FIG. 16 is a schematic diagram of a system.

FIG. 16 is a schematic diagram of a system 1600. The system 1600 comprises a transceiver 1610, a computer 1620, a display 1630, an OUT 1640 labeled $\sigma_1$, and secondary objects 1650 labeled $\sigma_2$, $\sigma_3$, and $\sigma_4$. The transceiver 1610 transmits and receives radar signals. The computer 1620 obtains and processes the radar signals, then outputs processed signals. The display 1630 displays the processed signals. The OUT 1640 and the secondary objects 1650 reflect signals from the transceiver 1610.

Figure 17:
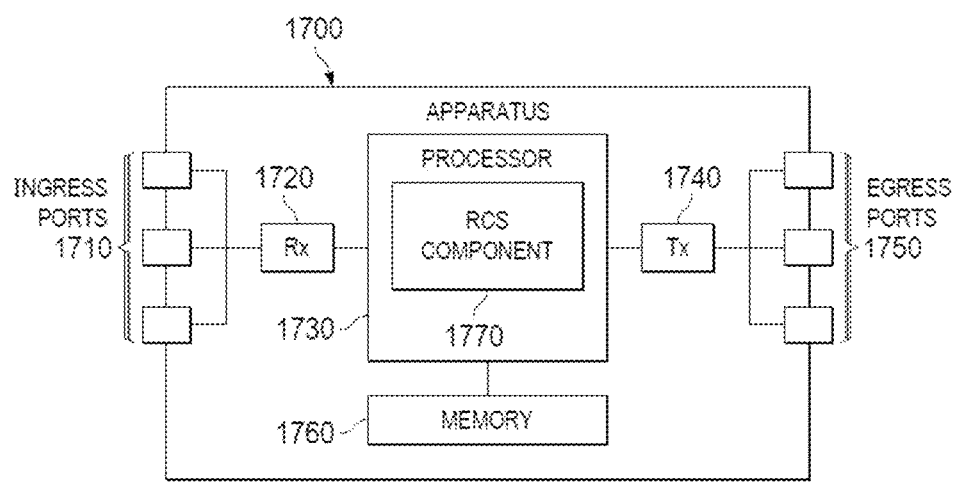
FIG. 17 is a schematic diagram of an apparatus.

FIG. 17 is a schematic diagram of an apparatus 1700. The apparatus 1700 may implement the disclosed embodiments, for instance, the computer 1620. The apparatus 1700 comprises ingress ports 1710 and an RX 1720 to receive data; a processor 1730, or logic unit, baseband unit, or CPU, to process the data; a TX 1740 and egress ports 1750 to transmit the data; and a memory 1760 to store the data. The apparatus 1700 may also comprise OE components, EO components, or RF components coupled to the ingress ports 1710, the RX 1720, the TX 1740, and the egress ports 1750 to provide ingress or egress of optical signals, electrical signals, or RF signals.

The processor 1730 is any combination of hardware, middleware, firmware, or software. The processor 1730 comprises any combination of one or more CPU chips, cores, FPGAs, ASICs, or DSPs. The processor 1730 communicates with the ingress ports 1710, the RX 1720, the TX 1740, the egress ports 1750, and the memory 1760. The processor 1730 comprises an RCS component 1770, which implements the disclosed embodiments. The inclusion of the RCS component 1770 therefore provides a substantial improvement to the functionality of the apparatus 1700 and effects a transformation of the apparatus 1700 to a different state. Alternatively, the memory 1760 stores the RCS component 1770 as instructions, and the processor 1730 executes those instructions.

The memory 1760 comprises any combination of disks, tape drives, or solid-state drives. The apparatus 1700 may use the memory 1760 as an over-flow data storage device to store programs when the apparatus 1700 selects those programs for execution and to store instructions and data that the apparatus 1700 reads during execution of those programs. The memory 1760 may be volatile or non-volatile and may be any combination of ROM, RAM, TCAM, or SRAM.

A computer program product may comprise computer-executable instructions that are stored on a computer-readable medium and that, when executed by a processor, cause an apparatus to perform any of the embodiments. The non-transitory medium may be the memory 1760, the processor may be the processor 1730, and the apparatus may be the apparatus 1700.

Figure 18:
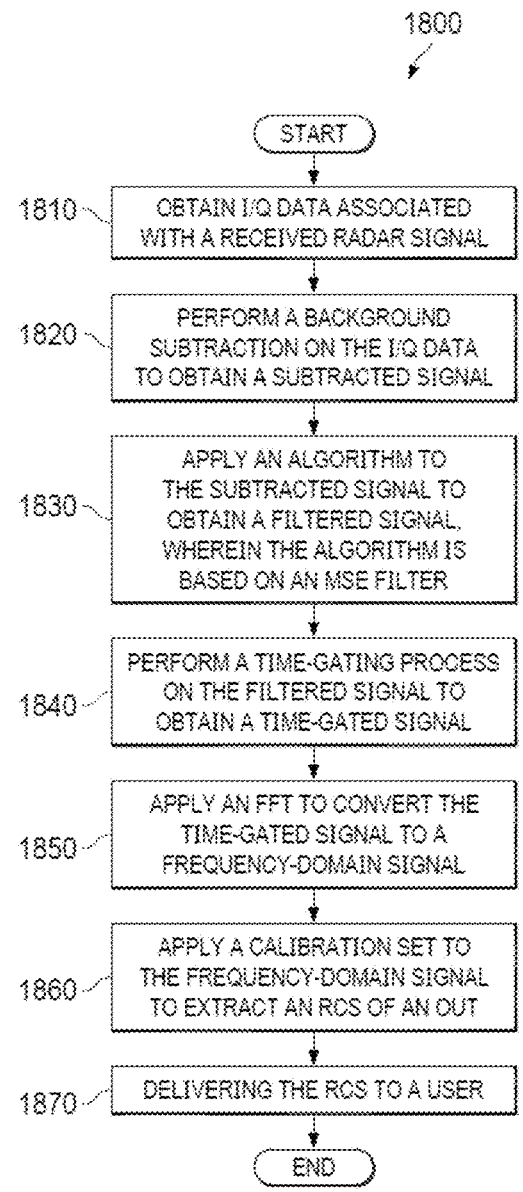
FIG. 18 is a flowchart illustrating a method of the present disclosure.

FIG. 18 is a flowchart illustrating a method 1800 of the present disclosure. The system 1600 may implement the method 1800. At step 1810, I/Q data associated with a received radar signal are obtained. At step 1820, a background subtraction is performed on the I/Q data to obtain a subtracted signal. At step 1830, an algorithm is applied to the subtracted signal to obtain a filtered signal, wherein the algorithm is based on an MSE filter. At step 1840, a time-gating process is performed on the filtered signal to obtain a time-gated signal. At step 1850, an FFT is applied to convert the time-gated signal to a frequency-domain signal. The FFT may be another suitable Fourier transform. At step 1860, a calibration set is applied to the frequency-domain signal to extract an RCS of an OUT. At step 1870, the RCS is delivered to a user.

The method 1800 may implement additional embodiments. For instance, an object is manufactured or modified based on the RCS. The background subtraction reduces or eliminates returns from scatterers other than the OUT. Applying the algorithm comprises applying the algorithm until a noise level limits a range profile estimation accuracy. The I/Q data are obtained using a VNA operating as an SFCW radar. The I/Q data are obtained using an OFDM radar. The OFDM radar is an SDR radar. The MSE filter is an RMMSE filter. The MSE filter is range-dependent. The MSE filter comprises a cost function. The cost function preserves a complex magnitude of a main lobe associated with the OUT. The algorithm uses APC. The algorithm may use IAA and other techniques as well. Applying the MSE filter comprises: obtaining an initial range profile estimate with an IFFT; estimating a noise variance; estimating a power $\rho(l)$; computing a filter $w(l)$; estimating a range profile x̂(l); and reiterating estimating the power ρ(l), computing the filter w(l), and estimating the range profile x̂(l) for P iterations. The IFFT may be another suitable inverse Fourier transform. The method is independent of a matched filter. Performing the time-gating comprises: converting the filtered signal to a time-domain signal using an IFFT; and applying a window to the time-domain signal to obtain the time-gate signal, wherein the window filters a range profile to include range bins associated with the OUT and suppress remaining range bins. Applying the calibration set comprises subtracting the calibration set from the frequency-domain signal. The method 1800 further comprises transmitting a transmitted signal. The method 1800 further comprises receiving the received radar signal in response to the transmitted signal. The method 1800 further comprises displaying the RCS. In addition to displaying the RCS, the RCS could be used to identify a target, classify the target, design radar receivers along with range requirements, and implement other applications. The target identification and classification may also be displayed.

For many projects, characterizing the RCS is the project deliverable. The action taken after the RCS extraction is application specific. The RCS information could be used to design radar system power levels or select which waveform to transmit. On the other hand, the RCS may be a manufacturing design specification of an object. If that object's measured RCS does not meet a specification, then the object, not the radar, would need to be modified.

In certain embodiments, after the RCS information is extracted, the RCS may be used to design and adjust a power level of a radar system, or may be used to select a particular waveform to transmit. In certain embodiments, the RCS information may be used as a specification for manufacturing and designing an object. For example, if the object's measured RCS does not meet specifications, the object can be modified accordingly (rather than a radar). Therefore, in certain embodiments, the method of the present disclosure may comprise the additional step of designing a radar system power level based on the RCS, and/or selecting a waveform based on the RCS, and/or operating a radar system based on the RCS, and/or manufacturing or modifying a radar system based on the RCS, and/or manufacturing an object based on the RCS, for example wherein the object is built to have a particular RCS, and the RCS of the object is verified or confirmed after a manufacturing step, or after a repair or modification to the object.

Having described various methods, systems, and other embodiments, certain aspects can include, but are not limited to:

A first aspect relates to a method comprising: obtaining I/Q data associated with a received radar signal; performing a background subtraction on the I/Q data to obtain a subtracted signal; applying an algorithm to the subtracted signal to obtain a filtered signal, wherein the algorithm is based on an MSE filter; performing a time-gating process on the filtered signal to obtain a time-gated signal; applying an FFT to convert the time-gated signal to a frequency-domain signal; applying a calibration set to the frequency-domain signal to extract an RCS of an OUT; and delivering the RCS to a user.

In a first implementation of the first aspect, the method further comprises manufacturing or modifying an object based on the RCS.

In a second implementation or any preceding implementation of the fist aspect, the background subtraction reduces or eliminates returns from scatterers other than the OUT.

In a third implementation or any preceding implementation of the fist aspect, applying the algorithm comprises applying the algorithm until a noise level limits a range profile estimation accuracy.

In a fourth implementation or any preceding implementation of the fist aspect, the method further comprises further obtaining the I/Q data using an SFCW radar, an SFCW waveform, an OFDM radar, or an OFDM waveform.

In a fifth implementation or any preceding implementation of the fist aspect, obtaining the I/Q data using the SFCW radar comprises obtaining the I/Q data using a VNA operating as the SFCW radar.

In a sixth implementation or any preceding implementation of the fist aspect, the MSE filter is an RMMSE filter or is range dependent, or the MSE filter comprises a cost function that preserves a complex magnitude of a main lobe associated with the OUT.

In a seventh implementation or any preceding implementation of the fist aspect, the algorithm uses APC.

In an eighth implementation or any preceding implementation of the fist aspect, applying the MSE filter comprises: obtaining an initial range profile estimate with an IFFT; estimating a noise variance; estimating a power ρ(l); computing a filter w(l); estimating a range profile x̂(l); and reiterating estimating the power ρ(l), computing the filter w(l), and estimating the range profile x̂(l) for P iterations.

In a ninth implementation or any preceding implementation of the fist aspect, the method is independent of a matched filter.

In a tenth implementation or any preceding implementation of the fist aspect, performing the time-gating process comprises: converting the filtered signal to a time-domain signal using an IFFT; and applying a window to the time-domain signal to obtain the time-gate signal, wherein the window filters a range profile to include range bins associated with the OUT and suppress remaining range bins.

In an eleventh implementation or any preceding implementation of the fist aspect, applying the calibration set comprises subtracting the calibration set from the frequency-domain signal.

In a twelfth implementation or any preceding implementation of the fist aspect, the method further comprises transmitting a transmitted signal.

In a thirteenth implementation or any preceding implementation of the fist aspect, the method further comprises receiving the received radar signal in response to the transmitted signal.

In a fourteenth implementation or any preceding implementation of the fist aspect, the method further comprises displaying the RCS.

A second aspect relates to a system comprising: a memory configured to store instructions; and a processor coupled to the memory and configured to execute the instructions to cause the processor to: obtain I/Q data associated with a received radar signal; perform a background subtraction on the I/Q data to obtain a subtracted signal; apply an algorithm to the subtracted signal to obtain a filtered signal, wherein the algorithm is based on an MSE filter; perform a time-gating process on the filtered signal to obtain a time-gated signal; apply an FFT to convert the time-gated signal to a frequency-domain signal; and apply a calibration set to the frequency-domain signal to extract an RCS of an OUT.

In a first implementation of the second aspect, the system further comprises a transceiver configured to: transmit a transmitted signal; and receive the received radar signal in response to the transmitted signal.

In a second implementation of the second aspect, the system further comprises a display configured to display the RCS.

A third aspect relates to a computer program product comprising instructions that are stored on a computer-readable medium and that, when executed by a processor, cause a system to: obtain I/Q data associated with a received radar signal; perform a background subtraction on the I/Q data to obtain a subtracted signal; apply an algorithm to the subtracted signal to obtain a filtered signal, wherein the algorithm is based on an MSE filter; perform a time-gating process on the filtered signal to obtain a time-gated signal; apply an FFT to convert the time-gated signal to a frequency-domain signal; and apply a calibration set to the frequency-domain signal to extract an RCS of an OUT.

In a first implementation of the third aspect, the algorithm uses APC.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   obtaining in-phase/quadrature (I/Q) data associated with a received radar signal;
   performing a background subtraction on the I/Q data to obtain a subtracted signal;
   applying an algorithm to the subtracted signal to obtain a filtered signal, wherein the algorithm is based on a mean square error (MSE) filter;
   performing a time-gating process on the filtered signal to obtain a time-gated signal;
   applying a fast Fourier transform (FFT) to convert the time-gated signal to a frequency-domain signal;
   applying a calibration set to the frequency-domain signal to extract a radar cross-section (RCS) of an object under test (OUT);
   delivering the RCS to a user; and
   manufacturing or modifying an object based on the RCS.

2. The method of claim 1, wherein the background subtraction reduces or eliminates returns from scatterers other than the OUT.

3. The method of claim 1, wherein applying the algorithm comprises applying the algorithm until a noise level limits a range profile estimation accuracy.

4. The method of claim 1, further comprising further obtaining the I/Q data using a stepped-frequency continuous-wave (SFCW) radar, an SFCW waveform, an orthogonal frequency-division multiplexing (OFDM) radar, or an OFDM waveform.

5. The method of claim 4, wherein obtaining the I/Q data using the SFCW radar comprises obtaining the I/Q data using a vector network analyzer (VNA) operating as the SFCW radar.

6. The method of claim 1, wherein the MSE filter is a reiterative minimum mean square error (RMMSE) filter or is range dependent, or wherein the MSE filter comprises a cost function that preserves a complex magnitude of a main lobe associated with the OUT.

7. The method of claim 1, wherein the algorithm uses adaptive pulse compression (APC).

8. The method of claim 1, wherein applying the MSE filter comprises:
   obtaining an initial range profile estimate with an inverse fast Fourier transform (IFFT);
   estimating a noise variance;
   estimating a power $\rho(l)$;
   computing a filter $w(l)$;
   estimating a range profile $\hat{x}(l)$; and
   reiterating estimating the power $\rho(l)$, computing the filter $w(l)$, and estimating the range profile $\hat{x}(l)$ for P iterations.

9. The method of claim 1, wherein the method is independent of a matched filter.

10. The method of claim 1, wherein performing the time-gating process comprises:
    converting the filtered signal to a time-domain signal using an inverse fast Fourier transform (IFFT); and
    applying a window to the time-domain signal to obtain the time-gate signal,
    wherein the window filters a range profile to include range bins associated with the OUT and suppress remaining range bins.

11. The method of claim 1, wherein applying the calibration set comprises subtracting the calibration set from the frequency-domain signal.

12. The method of claim 1, further comprising displaying the RCS.

13. A method comprising:
    transmitting a transmitted signal;
    obtaining in-phase/quadrature (I/Q) data associated with a received radar signal;
    performing a background subtraction on the I/Q data to obtain a subtracted signal;
    applying an algorithm to the subtracted signal to obtain a filtered signal, wherein the algorithm is based on a mean square error (MSE) filter;
    performing a time-gating process on the filtered signal to obtain a time-gated signal;
    applying a fast Fourier transform (FFT) to convert the time-gated signal to a frequency-domain signal;
    applying a calibration set to the frequency-domain signal to extract a radar cross-section (RCS) of an object under test (OUT); and
    delivering the RCS to a user.

14. The method of claim 13, further comprising receiving the received radar signal in response to the transmitted signal.

15. A system comprising:
    a memory configured to store instructions;
    one or more processors coupled to the memory and configured to execute the instructions to cause the system to:

obtain in-phase/quadrature (I/Q) data associated with a received radar signal;
perform a background subtraction on the I/Q data to obtain a subtracted signal;
apply an algorithm to the subtracted signal to obtain a filtered signal, wherein the algorithm is based on a mean square error (MSE) filter;
perform a time-gating process on the filtered signal to obtain a time-gated signal;
apply a fast Fourier transform (FFT) to convert the time-gated signal to a frequency-domain signal; and
apply a calibration set to the frequency-domain signal to extract a radar cross-section (RCS) of an object under test (OUT), wherein the RCS is delivered to a user; and
a transceiver configured to:
transmit a transmitted signal; and
receive the received radar signal in response to the transmitted signal.

16. The system of claim 15, further comprising a display configured to display the RCS.

17. The system of claim 15, wherein the background subtraction reduces or eliminates returns from scatterers other than the OUT.

18. The system of claim 15, wherein the instructions, when executed by the one or more processors, further cause the system to further apply the algorithm until a noise level limits a range profile estimation accuracy.

19. A computer program product comprising instructions that are stored on a non-transitory computer-readable medium and that, when executed by one or more processors, cause a system to:
transmit a transmitted signal;
obtain in-phase/quadrature (I/Q) data associated with a received radar signal;
perform a background subtraction on the I/Q data to obtain a subtracted signal;
apply an algorithm to the subtracted signal to obtain a filtered signal, wherein the algorithm is based on a mean square error (MSE) filter;
perform a time-gating process on the filtered signal to obtain a time-gated signal;
apply a fast Fourier transform (FFT) to convert the time-gated signal to a frequency-domain signal; and
apply a calibration set to the frequency-domain signal to extract a radar cross-section (RCS) of an object under test (OUT), wherein the RCS is delivered to a user.

20. The computer program product of claim 19, wherein the algorithm uses adaptive pulse compression (APC).

\* \* \* \* \*